(12) United States Patent
Saito et al.

(10) Patent No.: US 8,080,099 B2
(45) Date of Patent: Dec. 20, 2011

(54) INK COMPOSITION, INK SET, AND IMAGE RECORDING METHOD

(75) Inventors: Yuko Saito, Kanagawa (JP); Naotaka Wachi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 323 days.

(21) Appl. No.: 12/382,474

(22) Filed: Mar. 17, 2009

(65) Prior Publication Data

US 2009/0246378 A1    Oct. 1, 2009

(30) Foreign Application Priority Data

Mar. 25, 2008  (JP) ................. 2008-079119

(51) Int. Cl.
   *C09D 11/02*  (2006.01)
(52) U.S. Cl. ............ 106/31.5; 106/31.43; 106/31.46; 106/31.48; 106/31.58
(58) Field of Classification Search .......... 106/31.46, 106/31.48, 31.5, 31.43, 31.58; 427/256; 347/100
See application file for complete search history.

(56) References Cited

U.S. PATENT DOCUMENTS

| | | | |
|---|---|---|---|
| 6,923,855 B2 * | 8/2005 | Harada et al. | 106/31.48 |
| 7,125,446 B2 * | 10/2006 | Potenza et al. | 106/31.5 |
| 7,311,393 B2 * | 12/2007 | Taguchi et al. | 347/100 |
| 7,776,144 B2 * | 8/2010 | Taguchi et al. | 106/31.5 |
| 2006/0016368 A1 * | 1/2006 | Ozawa et al. | 106/31.48 |
| 2008/0274283 A1 * | 11/2008 | Tateishi et al. | 427/256 |
| 2009/0148602 A1 * | 6/2009 | Tojo | 427/256 |
| 2009/0246379 A1 * | 10/2009 | Wachi et al. | 427/256 |
| 2010/0071588 A1 * | 3/2010 | Wachi | 106/31.5 |
| 2010/0075041 A1 * | 3/2010 | Wachi et al. | 106/31.5 |

FOREIGN PATENT DOCUMENTS

| | | |
|---|---|---|
| JP | 3-103484 | 4/1991 |
| JP | 4-39365 | 2/1992 |
| JP | 2000-303009 | 10/2000 |
| JP | 2001-335714 | 12/2001 |
| JP | 2004-331699 | 11/2004 |

* cited by examiner

*Primary Examiner* — Helene Klemanski
(74) *Attorney, Agent, or Firm* — Jean C. Edwards, Esq.; Edwards Neils PLLC

(57) ABSTRACT

This invention provides an ink composition comprising at least a dye represented by the following Formula (1), monohydric alcohol having 1 to 5 carbon atoms, and urea:

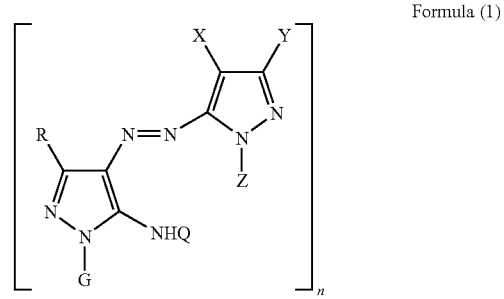

Formula (1)

wherein G represents a heterocyclic group; n represents an integer from 1 to 3; when n is 1, R, X, Y, Z, Q, and G each represent a monovalent group; when n is 2, R, X, Y, Z, Q, and G each represent a monovalent or divalent substituent, in which at least one of R, X, Y, Z, Q, or G represents a divalent substituent; and when n is 3, R, X, Y, Z, Q, and G each represent a monovalent, divalent, or trivalent substituent, in which at least two of R, X, Y, Z, Q, or G represent a divalent substituent or represent a trivalent substituent.

13 Claims, No Drawings

INK COMPOSITION, INK SET, AND IMAGE RECORDING METHOD

CROSS-REFERENCE TO RELATED APPLICATIONS

This application claims priority under 35 USC 119 from Japanese Patent Application No. 2008-079119, filed Mar. 25, 2008, the disclosure of which is incorporated by reference herein.

BACKGROUND

1. Field of the Invention

The present invention relates to an ink composition, an ink set, and an image recording method.

2. Related Art

For color image recording materials, so-called subtractive three primary color dyes (dyes or pigments) and a black dye have been used to reproduce or record full color images. However, under the current circumstances, there is no dye with fastness having absorption properties capable of realizing preferable color reproduction regions and having resistance to various use conditions. Thus, improvement thereof has been strongly desired.

Ink jet recording methods have been rapidly popularized and are undergoing further development because the methods have advantages of low material costs, capability for high-speed recording, and low recording noise, and further allow color recording with ease.

The ink jet recording methods include continuous methods in which droplets are ejected in succession and on-demand methods in which droplets are ejected according to image information signals. In the ink jet recording methods, the droplets of an ink are discharged by a method of applying pressure to the ink by a piezo device; heating the ink to generate bubbles therein; using an ultrasonic wave; or aspirating the ink by an electrostatic force. As inks for ink jet recording, water-based inks, oil-based inks, or solid (melting-type) inks are used.

Colorants contained in the ink for ink jet recording are required to have excellent solubility or dispersibility in a solvent; to be capable of recording with a high density; to be excellent in hue; to have fastness with respect to light, heat, environmental active gases (e.g., SOx in addition to oxidizing gases such as NOx and ozone), water, and chemicals; to have excellent fixability with respect to an image receiving material and hardly blur; to be excellent in storability as an ink; to have no toxicity; to be high in purity; and to be available at a low price.

In order to satisfy these requirements, ink jet dyes have been vigorously developed which have fastness with respect to light, heat, and environmental active gases (e.g., Japanese Patent Application Laid-Open (JP-A) Nos. 2001-335714, 3-103484, 4-39365, and 2000-303009). Moreover, it is disclosed that fastness increases by the use of dyes having an oxidation potential nobler than 0.8 V (vs SCE) (e.g., JP-A No. 2004-331699).

SUMMARY

The present invention has been made in view of the above circumstances and provides an ink composition, an ink set, and an image recording method.

A first aspect of the invention provides an ink composition comprising at least a dye represented by the following Formula (1), monohydric alcohol having 1 to 5 carbon atoms, and urea:

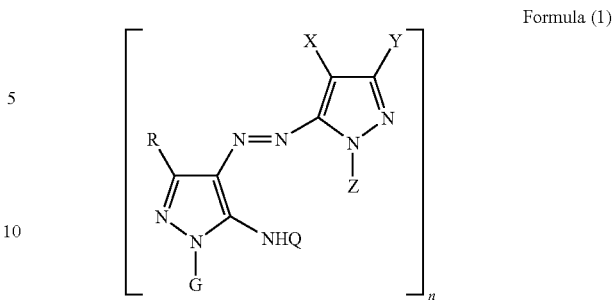

Formula (1)

wherein G represents a heterocyclic group; n represents an integer from 1 to 3; when n is 1, R, X, Y, Z, Q, and G each represent a monovalent group; when n is 2, R, X, Y, Z, Q, and G each represent a monovalent or divalent substituent, in which at least one of R, X, Y, Z, Q, or G represents a divalent substituent; and when n is 3, R, X, Y, Z, Q, and G each represent a monovalent, divalent, or trivalent substituent, in which at least two of R, X, Y, Z, Q, or G represent a divalent substituent or represent a trivalent substituent.

DETAILED DESCRIPTION OF THE INVENTION

Hereinafter, an ink composition, an ink set, and an image forming method of the invention will be described in detail.

<Ink Composition>

The ink composition of the invention (hereinafter also referred to as "ink") at least contains a dye represented by Formula (1), monohydric alcohol having 1 to 5 carbon atoms, and urea.

By the use of a dye having a structure represented by Formula (1), monohydric alcohol having 1 to 5 carbon atoms, and urea in combination, the ink composition of the invention is excellent in image fastness, and when an image receiving material on which an image has been formed at a high rate is overlaid, density differences between a part where the image receiving material is overlaid and a part where the image receiving material is not overlaid are improved.

[Monohydric Alcohol Having 1 to 5 Carbon Atoms]

Preferable examples of monohydric alcohol having 1 to 5 carbon atoms (hereinafter also referred to as specific monohydric alcohol) include methanol, ethanol, 1-propanol, 2-propanol, 1-butanol, 2-butanol, 2-methylpropanol, 1-pentanol, 2-pentanol, 3-pentanol, 2-methylbutanol, and 3-methyl-2-butanol, and among these, ethanol, propanols, and butanols are particularly preferable.

Specific monohydric alcohols may be used singly or in combination of two or more kinds.

In the invention, the content of monohydric alcohol having 1 to 5 carbon atoms in the ink is preferably from 0.1% by mass to 15% by mass, and more preferably from 1% by mass to 5% by mass.

When the content of monohydric alcohol having 1 to 5 carbon atoms is 0.1% by mass or more, in a case where an image receiving material on which an image has been formed is overlaid, an effect of reducing density differences between a part where the image receiving material is overlaid and a part where the image receiving material is not overlaid is always obtained. When the content thereof is 15% by mass or lower, problems in which printed dots blur, thereby deteriorating image quality hardly occur.

[Urea]

In the invention, the content of urea in the ink is preferably from 1% by mass to 15% by mass, and more preferably from 4% by mass to 12% by mass.

When the content of urea is 1% by mass or more, in a case where an image receiving material on which an image has been formed is overlaid, an effect of reducing density differences between a part where the image receiving material is overlaid and a part where the image receiving material is not overlaid is always obtained. When the content thereof is 15% by mass or lower, problems in which urea is deposited after printing, thereby deteriorating image quality do not occur.

[Dye Represented by Formula (1)]

A dye represented by Formula (1) will be described.

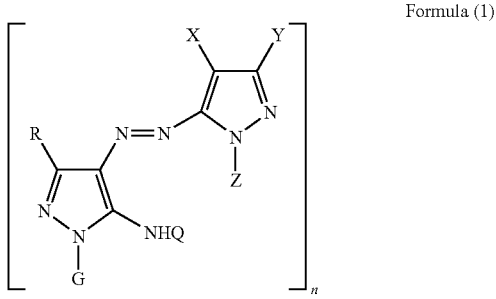

Formula (1)

wherein G represents a heterocyclic group; n represents an integer from 1 to 3; when n is 1, R, X, Y, Z, Q, and G each represent a monovalent group; when n is 2, R, X, Y, Z, Q, and G each represent a monovalent or divalent substituent, in which at least one of R, X, Y, Z, Q, or G represents a divalent substituent; and when n is 3, R, X, Y, Z, Q, and G each represent a monovalent, divalent, or trivalent substituent, in which at least two of R, X, Y, Z, Q, or G represent a divalent substituent or represent a trivalent substituent.

In Formula (1), preferable examples of substituents of G include 5- to 8-membered heterocyclic groups. Among the above, 5- or 6-membered substituted or unsubstituted aromatic or non-aromatic heterocyclic groups are preferable, and they may be further condensed. More preferable examples include 5- or 6-membered aromatic heterocyclic groups having 3 to 30 carbon atoms.

Examples of the heterocyclic group represented by G include, with no limitation on substitution sites, pyridine, pyrazine, pyridazine, pyrimidine, triazine, quinoline, isoquinoline, quinazolin, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazol, benzisoxazole, pyrrolidine, piperidine, piperazine, imidazolidine, thiazoline, and sulfolane.

When the heterocyclic group is a group capable of further having a substituent, the following substituents may be further contained.

Examples include a straight or branched chain alkyl group having 1 to 12 carbon atoms, a straight or branched chain aralkyl group having 7 to 18 carbon atoms, a straight or branched chain alkenyl group having 2 to 12 carbon atoms, a straight or branched chain alkynyl group having 2 to 12 carbon atoms, an unsubstituted or substituted cycloalkyl group having 3 to 12 carbon atoms, an unsubstituted or substituted cycloalkenyl group having 3 to 12 carbon atoms (Among the above-mentioned respective groups, those having branched chains are preferable because they increase solubility of dyes and stability of inks, and those having asymmetrical carbons are particularly preferable. Examples include methyl, ethyl, propyl, isopropyl, sec-butyl, t-butyl, 2-ethylhexyl, 2-methylsulfonyl ethyl, 3-phenoxypropyl, trifluoromethyl, and cyclopentyl), a halogen atom (e.g., a chlorine atom or a bromine atom), an aryl group (e.g., phenyl, 4-t-butylphenyl, or 2,4-di-t-amyl phenyl), hetero 2-pyrimidinyl or 2-benzothiazolyl), a cyano group, a hydroxyl group, a nitro group, a carboxyl group, an amino group, an alkyloxy group (e.g., methoxy, ethoxy, 2-methoxyethoxy, or 2-methylsulfonyl ethoxy), an aryloxy group (e.g., phenoxy, 2-methylphenoxy, 4-t-butylphenoxy, 3-nitrophenoxy, 3-t-butyloxy carbonyl phenoxy, or 3-methoxycarbonyl phenyloxy), an acylamino group (e.g., acetamide, benzamide, or 4-(3-t-butyl-4-hydroxyphenoxy)butaneamide), an alkylamino group (e.g., methylamino, butylamino, diethylamino, or methylbutylamino), an anilino group (e.g., phenylamino or 2-chloroanilino), a ureido group (e.g., phenyl ureido, methyl ureido, or N,N-dibutyl ureido), a sulfamoylamino group (e.g., N,N-dipropylsulfamoylamino), an alkylthio group (e.g., methylthio, octylthio, or 2-phenoxyethylthio), an arylthio group (e.g., phenylthio, 2-butoxy-5-t-octyl phenylthio, or 2-carboxy phenylthio), an alkyloxy carbonylamino group (e.g., methoxycarbonylamino), an alkylsulfonylamino group and arylsulfonylamino group (e.g., methylsulfonylamino, phenylsulfonylamino, or p-toluenesulfonylamino), a carbamoyl group (e.g., N-ethylcarbamoyl or N,N-dibutylcarbamoyl), a sulfamoyl group (e.g., N-ethyl sulfamoyl, N,N-dipropyl sulfamoyl, or N-phenyl sulfamoyl), a sulfonyl group (e.g., methylsulfonyl, octylsulfonyl, phenylslufonyl, or p-toluenesulfonyl), an alkyloxy carbonyl group (e.g., methoxy carbonyl or butyloxy carbonyl), a heterocyclic oxy group (e.g., 1-phenyltetrazole-5-oxy or 2-tetrahydropyranyloxy), an azo group (e.g., phenylazo, 4-methoxy phenylazo, 4-pivaloyl amino phenylazo, or 2-hydroxy-4-propanoyl phenylazo), an acyloxy group (e.g., acetoxy), a carbamoyloxy group (e.g., N-methylcarbamoyloxy or N-phenylcarbamoyloxy), a silyloxy group (e.g., trimethylsilyloxy or dibutylmethyl silyloxy), an aryloxycarbonylamino group (e.g., phenoxycarbonylamino), an imido group (e.g., N-succinimide or N-phthalimide), a heterocyclic thio group (e.g., 2-benzothiazolylthio, 2,4-di-phenoxy-1,3,5-triazole-6-thio, or 2-pyridylthio), a sulfinyl group (e.g., 3-phenoxypropylsulfinyl), a phosphonyl group (e.g., phenoxy phosphonyl, octyloxy phosphonyl, or phenyl phosphonyl), an aryloxy carbonyl group (e.g., phenoxycarbonyl), an acyl group (e.g., acetyl, 3-phenylpropanoly, or benzoyl), and ionic hydrophilic groups (e.g., a carboxyl group, a sulfo group, a phosphono group, and a quaternary ammonium group).

Preferable examples of substituents of Q, R, X, Y, and Z in Formula (1) will be described in detail.

When Q, R, X, Y, and Z represent a monovalent group, they each represent hydrogen atom or a monovalent substituent as a monovalent group. The monovalent substituent will be described in more detail. Examples of the monovalent substituent include a halogen atom, an alkyl group, a cycloalkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxy carbonyloxy group, an aryloxy carbonyloxy group, an amino group (an alkylamino group or an arylamino group), an acylamino group (an amide group), an aminocarbonyl amino group (a ureido group), an alkoxycarbonylamino group, an aryloxycarbonylamino group, a sulfamoylamino group, an alkylsulfonylamino group, an arylsulfonylamino group, an alkylthio group, an arylthio group, a heterocyclic thio group, a sulfamoyl group, an alkyl sulfinyl group, an aryl sulfinyl group, an alkyl sulfonyl group, an aryl sulfonyl group, an acyl group, an aryloxy carbonyl group, an alkoxycarbonyl group, a carbamoyl group, a phosphino group, a phosphinyl group, a phosphinyloxy group, a phosphinyl amino group, a silyl group, an azo group, and an imido group. Each group may further have a substituent.

Among the above, a hydrogen atom, a halogen atom, an alkyl group, an aryl group, a heterocyclic group, a cyano group, an alkoxy group, an amide group, a ureido group, an alkylsulfonylamino group, an arylsulfonylamino group, a sulfamoyl group, an alkylsulfonyl group, an arylsulfonyl group, a carbamoyl group, or an alkoxycarbonyl group is particularly preferable. In particular, a hydrogen atom, a halogen atom, an alkyl group, an aryl group, a cyano group, an alkylsulfonyl group, an arylsulfonyl group, or a heterocyclic group is preferable, and a hydrogen atom, an alkyl group, an aryl group, a cyano group, or an alkylsulfonyl group is the most preferable.

Hereinafter, the Q, R, X, Y, and Z will be described in more detail.

The halogen atoms represented by Q, R, X, Y, and Z each represent a chlorine atom, a bromine atom, or an iodine atom. Among the above, a chlorine atom or a bromine atom is preferable, and particularly a chlorine atom is preferable.

The alkyl group represented by Q, R, X, Y, and Z includes a substituted or unsubstituted alkyl group. As the substituted or unsubstituted alkyl group, an alkyl group having 1 to 30 carbon atoms is preferable. Examples of the substituent are the same as exemplified about in the case when G represents a group that may further have a substituent. In particular, a hydroxyl group, an alkoxy group, a cyano group, a halogen atom, a sulfo group (which may be in the form of a salt), or a carboxyl group (which may be in the form of a salt) is preferable. Examples of the alkyl group may include methyl, ethyl, butyl, t-butyl, n-octyl, eicosyl, 2-chloroethyl, hydroxyethyl, cyanoethyl, and 4-sulfobutyl.

The cycloalkyl group represented by Q, R, X, Y, and Z includes a substituted or unsubstituted cycloalkyl group. As the substituted or unsubstituted cycloalkyl group, a cycloalkyl group having 5 to 30 carbon atoms is preferable. Examples of the substituent are the same as exemplified about in the case when G represents a group that may further have a substituent. Examples of the cycloalkyl group may include cyclohexyl, cyclopentyl, and 4-n-dodecylcyclohexyl.

The aralkyl group represented by Q, R, X, Y, and Z includes a substituted or unsubstituted aralkyl group. As the substituted or unsubstituted aralkyl group, an aralkyl group having 7 to 30 carbon atoms is preferable. Examples of the substituent are the same as exemplified about in the case when G represents a group that may further have a substituent. Examples of the aralkyl group may include benzyl and 2-phenethyl.

The alkenyl group represented by Q, R, X, Y, and Z each represents a substituted or unsubstituted alkenyl group that may be a straight chain, branched chain, or cyclic form. Preferable examples include a substituted or unsubstituted alkenyl group having 2 to 30 carbon atoms, such as vinyl, allyl, prenyl, geranyl, oleyl, 2-cyclopentene-1-yl, and 2-cyclohexene-1-yl.

The alkynyl group represented by Q, R, X, Y, and Z may be a substituted or unsubstituted alkynyl group having 2 to 30 carbon atoms, such as, for example, ethynyl or propargyl.

The aryl group represented by Q, R, X, Y, and Z may be a substituted or unsubstituted aryl group having 6 to 30 carbon atoms, and examples may include phenyl, p-tolyl, naphthyl, m-chlorophenyl, and o-hexadecanoyl aminophenyl. Examples of the substituent are the same as exemplified about in the case when G represents a group that may further have a substituent.

The heterocyclic group represented by Q, R, X, Y, and Z may be a monovalent group obtained by removing one hydrogen atom from a 5- or 6-membered substituted or unsubstituted aromatic or non-aromatic heterocyclic compound, which may be further condensed. A 5- or 6-membered aromatic heterocyclic group having 3 to 30 carbon atoms are more preferable. Examples of the substituent are the same as exemplified about in the case when G represents a group that may further have a substituent. Examples of the heterocyclic group include, with no limitation on substitution sites, pyridine, pyrazine, pyridazine, pyrimidine, triazine, quinoline, isoquinoline, quinazolin, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazol, benzisoxazole, pyrrolidine, piperidine, piperazine, imidazolidine, and thiazoline.

The alkoxy group represented by Q, R, X, Y, and Z includes a substituted or unsubstituted alkoxy group. As the substituted or unsubstituted alkoxy group, an alkoxy group having 1 to 30 carbon atoms is preferable. Examples of the substituent are the same as exemplified about in the case when G represents a group that may further have a substituent. Examples of the alkoxy group may include methoxy, ethoxy, isopropoxy, n-octyloxy, methoxyethoxy, hydroxyethoxy, and 3-carboxypropoxy.

The aryloxy group represented by Q, R, X, Y, and Z may preferably be a substituted or unsubstituted aryloxy group having 6 to 30 carbon atoms. Examples of the substituent are the same as exemplified about in the case when G represents a group that may further have a substituent. Examples of the aryloxy group may include phenoxy, 2-methylphenoxy, 4-t-butylphenoxy, 3-nitrophenoxy, and 2-tetradecanoylamino phenoxy.

The silyloxy group represented by Q, R, X, Y, and Z may preferably be a silyloxy group having 3 to 20 carbon atoms, and examples may include trimethylsilyloxy and t-butyldimethylsilyloxy.

The heterocyclic oxy group represented by Q, R, X, Y, and Z may preferably be a substituted or unsubstituted heterocyclic oxy group having 2 to 30 carbon atoms. Examples of the substituent are the same as exemplified about in the case when G represents a group that may further have a substituent. Examples of the heterocyclic oxy group may include 1-phenyltetrazole-5-oxy and 2-tetrahydropyranyloxy.

The acyloxy group represented by Q, R, X, Y, and Z may preferably be a formyloxy group, a substituted or unsubstituted alkylcarbonyloxy group having 2 to 30 carbon atoms, or a substituted or unsubstituted arylcarbonyloxy group having 6 to 30 carbon atoms. Examples of the substituent are the same as exemplified about in the case when G represents a group that may further have a substituent. Examples of the acyloxy group may include formyloxy, acetyloxy, pivaloyloxy, stearoyloxy, benzoyloxy, and p-methoxyphenyl carbonyloxy.

The carbamoyloxy group represented by Q, R, X, Y, and Z may preferably be a substituted or unsubstituted carbamoyloxy group having 1 to 30 carbon atoms. Examples of the substituent are the same as exemplified about in the case when G represents a group that may further have a substituent. Examples of the carbamoyloxy group may include N,N-dimethylcarbamoyloxy, N,N-diethylcarbamoyloxy, morpholino carbonyloxy, N,N-di-n-octyl aminocarbonyloxy, and N-n-octyl carbamoyloxy.

The alkoxy carbonyloxy group represented by Q, R, X, Y, and Z may preferably be a substituted or unsubstituted alkoxy carbonyloxy group having 2 to 30 carbon atoms. Examples of the substituent are the same as exemplified about in the case when G represents a group that may further have a substituent. Examples of the alkoxy carbonyloxy group may include methoxycarbonyloxy, ethoxycarbonyloxy, t-buthoxycarbonyloxy, and n-octyl carbonyloxy.

The aryloxy carbonyloxy group represented by Q, R, X, Y, and Z may preferably be a substituted or unsubstituted aryloxy carbonyloxy group having 7 to 30 carbon atoms. Examples of the substituent are the same as exemplified about in the case when G represents a group that may further have a substituent. Example of the aryloxy carbonyloxy group may include phenoxy carbonyloxy, p-methoxy phenoxy carbonyloxy, and p-n-hexadecyloxyphenoxy carbonyloxy.

The amino group represented by Q, R, X, Y, and Z may preferably be a substituted or unsubstituted alkylamino group having 1 to 30 carbon atoms or a substituted or unsubstituted arylamino group having 6 to 30 carbon atoms. Examples of the substituent are the same as exemplified about in the case when G represents a group that may further have a substituent. Examples of the amino group may include amino, methylamino, dimethylamino, anilino, N-methyl-anilino, diphenylamino, hydroxyethylamino, carboxy ethylamino, sulfoethylamino, and 3,5-dicarboxyanilino.

The acylamino group represented by Q, R, X, Y, and Z may preferably be a formylamino group, a substituted or unsubstituted alkyl carbonylamino group having 1 to 30 carbon atoms, and a substituted or unsubstituted aryl carbonylamino group having 6 to 30 carbon atoms. Examples of the substituent are the same as exemplified about in the case when G represents a group that may further have a substituent. Examples of the acylamino group may include formylamino, acetylamino, pivaloyl amino, lauroyl amino, benzoylamino, and 3,4,5-tri-n-octyloxyphenylcarbonylamino.

The aminocarbonyl amino group represented by Q, R, X, Y, and Z may preferably be a substituted or unsubstituted aminocarbonyl amino group having 1 to 30 carbon atoms. Examples of the substituent are the same as exemplified about in the case when G represents a group that may further have a substituent. Examples of the aminocarbonyl amino group may include carbamoylamino, N,N-dimethylaminocarbonylamino, N,N-diethylaminocarbonylamino, and morpholinocarbonylamino.

The alkoxycarbonylamino group represented by Q, R, X, Y, and Z may preferably be a substituted or unsubstituted alkoxycarbonylamino group having 2 to 30 carbon atoms. Examples of the substituent are the same as exemplified about in the case when G represents a group that may further have a substituent. Examples of the alkoxycarbonylamino group may include methoxycarbonylamino, ethoxycarbonylamino, t-butoxycarbonylamino, n-octadecyloxycarbonylamino, and N-methyl-methoxycarbonylamino.

The aryloxycarbonylamine group represented by Q, R, X, Y, and Z may preferably be a substituted or unsubstituted aryloxycarbonylamino group having 7 to 30 carbon atoms. Examples of the substituent are the same as exemplified about in the case when G represents a group that may further have a substituent. Examples of the aryloxycarbonylamino group may include phenoxycarbonylamino, p-chlorophenoxycarbonylamino, and m-n-octyloxyphenoxycarbonylamino.

The sulfamoylamino group represented by Q, R, X, Y, and Z may preferably be a substituted or unsubstituted sulfamoylamino group having 0 to 30 carbon atoms. Examples of the substituent are the same as exemplified about in the case when G represents a group that may further have a substituent. Examples of the sulfamoylamino group may include sulfamoylamino, N,N-dimethylamino sulfonylamino, and N-n-octylamino sulfonylamino.

The alkylsulfonylamino group and the arylsulfonylamino group represented by Q, R, X, Y, and Z may preferably be a substituted or unsubstituted alkylsulfonylamino group having 1 to 30 carbon atoms or a substituted or unsubstituted arylsulfonylamino group having 6 to 30 carbon atoms. Examples of the substituent are the same as exemplified about in the case when G represents a group that may further have a substituent. Examples of the alkylsulfonylamino group and the arylsulfonylamino group may include methylsulfonylamino, butylsulphonylamino, phenylsulfonylamino, 2,3,5-trichlorophenyl sulfonylamino, and p-methylphenyl sulfonylamino.

The alkylthio group represented by Q, R, X, Y, and Z may preferably be a substituted or unsubstituted alkylthio group having 1 to 30 carbon atoms. Examples of the substituent are the same as exemplified about in the case when G represents a group that may further have a substituent. Examples of the alkylthio group may include methylthio, ethylthio, and n-hexadecylthio.

The arylthio group represented by Q, R, X, Y, and Z may preferably be a substituted or unsubstituted arylthio group having 6 to 30 carbon atoms. Examples of the substituent are the same as exemplified about in the case when G represents a group that may further have a substituent. Examples of the arylthio group may include phenylthio, p-chlorophenylthio, and m-methoxyphenylthio.

The heterocyclic thio group represented by Q, R, X, Y, and Z may preferably be a substituted or unsubstituted heterocyclic thio group having 2 to 30 carbon atoms. Examples of the substituent are the same as exemplified about in the case when G represents a group that may further have a substituent. Examples of the heterocyclic thio group may include 2-benzothiazolylthio and 1-phenyltetrazole-5-yl thio.

The sulfamoyl group represented by Q, R, X, Y, and Z may preferably be a substituted or unsubstituted sulfamoyl group having 0 to 30 carbon atoms. Examples of the substituent are the same as exemplified about in the case when G represents a group that may further have a substituent. Examples of the sulfamoyl group may include N-ethyl sulfamoyl, N-(3-dodecyloxypropyl) sulfamoyl, N,N-dimethyl sulfamoyl, N-acetyl sulfamoyl, N-benzoyl sulfamoyl, and N—(N'-phenylcarbamoyl) sulfamoyl.

The alkylsulfinyl group and the arylsulfinyl group represented by Q, R, X, Y, and Z may preferably be a substituted or unsubstituted alkyl sulfinyl group having 1 to 30 carbon atoms or a substituted or unsubstituted aryl sulfinyl group having 6 to 30 carbon atoms. Examples of the substituent are the same as exemplified about in the case when G represents a group that may further have a substituent. Examples of the alkyl sulfinyl group and the aryl sulfinyl group may include methylsulfinyl, ethylsulfinyl, phenylsulfinyl, and p-methylphenylsulfinyl.

The alkylsulfonyl group and the arylsulfonyl group represented by Q, R, X, Y, and Z may preferably be a substituted or unsubstituted alkylsulfonyl group having 1 to 30 carbon atoms and a substituted or unsubstituted arylsulfonyl group having 6 to 30 carbon atoms. Examples of the substituent are the same as exemplified about in the case when G represents a group that may further have a substituent. Examples of the alkylsulfonyl group and the arylsulfonyl group may include methylsulfonyl, ethylsulfonyl, phenylsulfonyl, and p-toluenesulfonyl.

The acyl group represented by Q, R, X, Y, and Z may preferably be a formyl group, a substituted or unsubstituted alkylcarbonyl group having 2 to 30 carbon atoms, a substituted or unsubstituted arylcarbonyl group having 7 to 30 carbon atoms, or a substituted or unsubstituted heterocyclic carbonyl group having 4 to 30 carbon atoms that bonded to a carbonyl group via a carbon atom. Examples of the substituent are the same as exemplified about in the case when G represents a group that may further have a substituent. Examples of the acyl group may include acetyl, pivaloyl, 2-chloroacetyl, stearoyl, benzoyl, p-n-octyloxyphenyl carbonyl, 2-pyridylcarbonyl, and 2-furylcarbonyl.

The aryloxy carbonyl group represented by Q, R, X, Y, and Z may preferably be a substituted or unsubstituted aryloxy carbonyl group having 7 to 30 carbon atoms. Examples of the substituent are the same as exemplified about in the case when G represents a group that may further have a substituent. Examples of the aryloxy carbonyl group may include phenoxycarbonyl, o-chlorophenoxycarbonyl, m-nitrophenoxycarbonyl, and p-t-butylphenoxycarbonyl.

The alkoxycarbonyl group represented by Q, R, X, Y, and Z may preferably be a substituted or unsubstituted alkoxycarbonyl group having 2 to 30 carbon atoms. Examples of the substituent are the same as exemplified about in the case when G represents a group that may further have a substituent. Examples of the alkoxycarbonyl group may include methoxycarbonyl, ethoxycarbonyl, t-butoxycarbonyl, and n-octadecyloxycarbonyl.

The carbamoyl group represented by Q, R, X, Y, and Z may preferably be a substituted or unsubstituted carbamoyl group having 1 to 30 carbon atoms. Examples of the substituent are the same as exemplified about in the case when G represents a group that may further have a substituent. Examples of the carbamoyl group may include carbamoyl, N-methylcarbamoyl, N,N-dimethylcarbamoyl, N,N-di-n-octyl carbamoyl, and N-(methylsulfonyl)carbamoyl.

The phosphino group represented by Q, R, X, Y, and Z may preferably be a substituted or unsubstituted phosphino group having 2 to 30 carbon atoms. Examples of the substituent are the same as exemplified about in the case when G represents a group that may further have a substituent. Examples of the phosphino group may include dimethylphosphino, diphenylphosphino, and methylphenoxyphosphino.

The phosphinyl group represented by Q, R, X, Y, and Z may preferably be a substituted or unsubstituted phosphinyl group having 2 to 30 carbon atoms. Examples of the substituent are the same as exemplified about in the case when G represents a group that may further have a substituent. Examples of the phosphinyl group may include phosphinyl, dioctyloxyphosphinyl, and diethoxyphosphinyl.

The phosphinyloxy group represented by Q, R, X, Y, and Z may preferably be a substituted or unsubstituted phosphinyloxy group having 2 to 30 carbon atoms. Examples of the substituent are the same as exemplified about in the case when G represents a group that may further have a substituent. Examples of the phosphinyloxy group may include diphenoxyphosphinyloxy and dioctyloxyphosphinyloxy.

The phosphinyl amino group represented by Q, R, X, Y, and Z may preferably be a substituted or unsubstituted phosphinyl amino group having 2 to 30 carbon atoms. Examples of the substituent are the same as exemplified about in the case when G represents a group that may further have a substituent. Examples of the phosphinyl amino group may include dimethoxyphosphinylamino and dimethylaminophosphinylamino.

The silyl group represented by Q, R, X, Y, and Z may preferably be a substituted or unsubstituted silyl group having 3 to 30 carbon atoms. Examples of the substituent are the same as exemplified about in the case when G represents a group that may further have a substituent. Examples of the silyl group may include trimethylsilyl, t-butyldimethylsilyl, and phenyldimethylsilyl.

Examples of the azo group represented by Q, R, X, Y, and Z may include phenylazo, 4-methoxyphenylazo, 4-pivaloylaminophenylazo, and 2-hydroxy-4-propanoylphenylazo.

Examples of the imido group represented by Q, R, X, Y, and Z may include N-succinimide and N-phthalimide.

When Q, R, X, Y, and Z represent a divalent group, the divalent group is preferably an alkylene group (e.g., methylene, ethylene, propylene, butylene, or pentylene), an alkenylene group (e.g., ethenylene or propenylene), an alkynylene group (e.g., ethynylene or propynylene), an arylene group (e.g., phenylene or naphthylene), a divalent heterocyclic group (e.g., 6-chloro-1,3,5-triazine-2,4-diyl group, pyrimidine-2,4-diyl group, pyrimidine-4,6-diyl group, quinoxaline-2,3-diyl group, or pyridazine 3,6-diyl), —O—, —CO—, —NR'— (R' represents a hydrogen atom, an alkyl group, or an aryl group), —S—, —SO$_2$—, —SO—, or combination thereof (e.g., —NHCH$_2$CH$_2$NH—, —NHCONH—, and the like).

An alkylene group, an alkenylene group, an alkynylene group, an arylene group, a divalent heterocyclic group, and an alkyl group or an aryl group of R may further have a substituent.

Examples of the substituent are the same as the substituents described for the G.

The alkyl group and the aryl group of the R' are the same as the examples of the substituent of the G.

More preferable examples of divalent group may include an alkylene group having 10 or less carbon atoms, an alkenylene group having 10 or less carbon atoms, an alkynylene group having 10 or less carbon atoms, an arylene group having 6 to 10 carbon atoms, a divalent heterocyclic group, —S—, —SO—, —SO$_2$—, and a combination thereof (e.g., —SCH$_2$CH$_2$S— or —SCH$_2$CH$_2$CH$_2$S—) is more preferable.

The total number of carbon atoms of the divalent linking group is preferably from 0 to 50, more preferably from 0 to 30, and most preferably from 0 to 10.

When Q, R, X, Y, and Z each represent a trivalent group, the trivalent group is preferably a trivalent hydrocarbon group, a trivalent heterocyclic group, >N—, or a combination thereof and a divalent group (e.g., >NCH$_2$CH$_2$NH—, >NCONH—, and the like).

The total number of carbon atoms of the trivalent linking group is preferably from 0 to 50, more preferably from 0 to 30, and most preferably from 0 to 10.

In Formula (1), preferable examples of n is 1 or 2, and 2 is particularly preferable.

In Formula (1), preferable examples of a substituent of X is an electron attracting group. In particular, an electron attracting group with a Hammett's substituent constant δp value of 0.20 or more is preferable, and an electron attracting group with a δp value of 0.30 or more is more preferable. It is an electron attracting group of 1.0 or less as the upper limit.

Specific examples of X which is an electron attracting group with a δp value of 0.20 or more include an acyl group, an acyloxy group, a carbamoyl group, an alkyloxycarbonyl group, an aryloxycarbonyl group, a cyano group, a nitro group, a dialkylphosphono group, a diarylphosphono group, a diarylphosphinyl group, an alkylsulfinyl group, an arylsulfinyl group, an alkylsulfonyl group, an arylsulfonyl group, a sulfonyloxy group, an acylthio group, a sulfamoyl group, a thiocyanate group, a thiocarbonyl group, an alkyl halide group, an alkoxy halide group, an aryloxy halide group, an alkylamino halide group, an alkylthio halide group, an aryl group substituted with another electron attracting group with a δp value of 0.20 or more, a heterocyclic group, a halogen atom, an azo group, and a selenocyanate group.

Preferable examples of X may include an acyl group having 2 to 12 carbon atoms, an acyloxy group having 2 to 12 carbon atoms, a carbamoyl group having 1 to 12 carbon atoms, an alkyloxycarbonyl group having 2 to 12 carbon atoms, an aryloxycarbonyl group having 7 to 18 carbon atoms, a cyano group, a nitro group, an alkylsulfinyl group having 1 to 12 carbon atoms, an arylsulfinyl group having 6 to 18 carbon atoms, an alkylsulfonyl group having 1 to 12 carbon atoms, an arylsulfonyl group having 6 to 18 carbon atoms, a sulfamoyl group having 0 to 12 carbon atoms, an alkyl halide group having 1 to 12 carbon atoms, an alkyloxy halide group having 1 to 12 carbon atoms, an alkyl thio halide group having 1 to 12 carbon atoms, an aryloxy halide group having 7 to 18 carbon atoms, an aryl group having 7 to 18 carbon atoms, substituted with two or more electron attracting groups with a δp of 0.20 or more, and a 5- to 8-membered heterocyclic group having 1 to 18 carbon atoms including a nitrogen atom, an oxygen atom, or a sulfur atom.

More preferable examples include a cyano group, an alkylsulfonyl group having 1 to 12 carbon atoms, an arylsulfonyl group having 6 to 18 carbon atoms, and a sulfamoyl group having 0 to 12 carbon atoms.

Particularly preferable examples of X include a cyano group, an alkylsulfonyl group having 1 to 12 carbon atoms, and a sulfamoyl group having 0 to 12 carbon atoms. Most preferable examples of X include a cyano group and an alkylsulfonyl group having 1 to 12 carbon atoms.

In Formula (1), preferable examples of the substituent of Z include a hydrogen atom, a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group, and a substituted or unsubstituted heterocyclic group.

Detailed examples of the substituent represented by Z are the same as the corresponding substituent examples described for the examples of the heterocyclic group represented by the G, and preferable examples thereof are also the same.

A particularly preferable substituents represented by Z include a substituted aryl group and a substituted heterocyclic group. Among the above, a substituted aryl group is particularly preferable.

In Formula (1), preferable examples of the substituent of Q include a hydrogen atom, a substituted or unsubstituted alkyl group, a substituted or unsubstituted acyl group, a substituted or unsubstituted alkylsulfonyl group, and a substituted or unsubstituted arylsulfonyl group. Particularly preferable examples include a hydrogen atom, a substituted or unsubstituted alkyl group, and a substituted or unsubstituted acyl group. Among the above, a hydrogen atom is particularly preferable.

In Formula (1), R is preferably a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12. Among the above, a straight or branched chain alkyl group having a total carbon number of 1 to 8 is preferable, a secondary or tertiary alkyl group is particularly preferable, and a t-butyl group is most preferable.

In Formula (Y-1), Y is preferably a hydrogen atom, a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12. Among the above, a hydrogen atom or a straight and/or branched chain alkyl group having a total carbon number of 1 to 8 are/is preferable, a hydrogen atom or an alkyl group having 1 to 8 carbon atoms is particularly preferable, and a hydrogen atom is most preferable.

As the combination of the preferable substituents of the dye represented by Formula (1) of the invention, a compound in which at least one of various substituents is the above mentioned preferable group is preferable, a compound in which a larger number of various substituents are the above mentioned preferable groups is more preferable, and a compound in which all the substituents are the above mentioned preferable substituents is most preferable.

The particularly preferable combinations for the dye represented by Formula (1) of the invention include the following (A) to (G):

(A) G is preferably a 5- to 8-membered nitrogen-containing heterocyclic ring. In particular, an S-triazine ring, a pyrimidine ring, a pyridazine ring, a pyrazine ring, a pyridine ring, an imidazole ring, a pyrazole ring, or a pyrrole ring is preferable. Among the above, an S-triazine ring, a pyrimidine ring, a pyridazine ring, or a pyrazine ring is preferable, with an S-triazine ring is most preferable.

(B) R is preferably a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12. Among the above, a straight or branched chain alkyl group having a total carbon number of 1 to 8 is preferable, a secondary or tertiary alkyl group is particularly preferable, and a t-butyl group is most preferable.

(C) As X, a cyano group, an alkylsulfonyl group having 1 to 12 carbon atoms, an arylsulfonyl group having 6 to 18 carbon atoms, or a sulfamoyl group having 0 to 12 carbon atoms is particularly preferably. Among the above, a cyano group or an alkylsulfonyl group having 1 to 12 carbon atoms is preferable, and a cyano group is most preferable.

(D) Y is preferably a hydrogen atom, a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12. Among the above, a hydrogen atom or a straight or branched chain alkyl group having a total carbon number of 1 to 8 is preferable, a hydrogen atom or an alkyl group having 1 to 8 carbon atoms is particularly preferable, and a hydrogen atom is most preferable.

(E) Z is preferably a hydrogen atom, a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group, further, a substituted aryl group or a substituted heterocyclic group is more preferable substituents. Among the above, a substituted aryl group is particularly preferable.

(F) Q is preferably a hydrogen atom, a substituted or unsubstituted alkyl group, a substituted or unsubstituted acyl group, a substituted or unsubstituted alkylsulfonyl group, or a substituted or unsubstituted arylsulfonyl group, further, a hydrogen atom, a substituted or unsubstituted alkyl group, or a substituted or unsubstituted acyl group is more preferable. Among the above, a hydrogen atom is particularly preferable.

(G) n represents an integer of 1 to 3, preferably 1 or 2, and 2 is most preferable.

Among the azo dyes represented by Formula (1), the dyes represented by Formulae (Y-1) to (Y-5) are preferable:

Hereinafter, Formula (Y-1) will be described in detail.

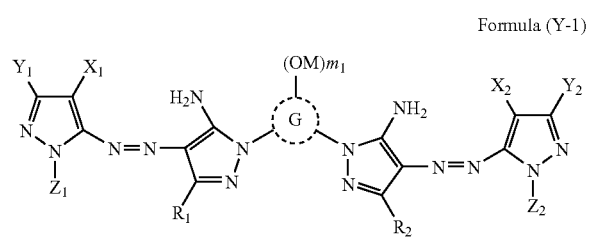

Formula (Y-1)

$R_1$, $R_2$, $X_1$, $X_2$, $Y_1$, $Y_2$, $Z_1$, and $Z_2$ each represent a monovalent group.

The monovalent group represents a hydrogen atom or a monovalent substituent. Examples of the monovalent substituent are the same as the examples of the monovalent substituents of R, X, Y, and Z in Formula (1), and preferable examples thereof are also the same. $m_1$ represents an integer of 0 to 3.

Hereinafter, the $R_1$, $R_2$, $X_1$, $X_2$, $Y_1$, $Y_2$, $Z_1$, and $Z_2$ will be described in more detail.

Examples of the substituents of $R_1$ and $R_2$ are each independently the same as the examples of R in Formula (1), and preferable examples thereof are also the same.

Examples of the substituents of $Y_1$ and $Y_2$ are each independently the same as the examples of Y in Formula (1), and preferable examples thereof are also the same.

Examples of the substituents of $Z_1$ and $Z_2$ are each independently the same as the examples of Z in Formula (1), and preferable examples thereof are also the same.

Hereinafter, the G and $m_1$ will be described in more detail.

G represents an atomic group forming a 5- to 8-membered nitrogen-containing heterocyclic ring.

Preferable examples of the 5- to 8-membered nitrogen-containing heterocyclic ring represented by G include an S-triazine ring, a pyrimidine ring, a pyridazine ring, a pyrazine ring, a pyridine ring, an imidazole ring, a pyrazole ring, and a pyrrole ring. Among the above, an S-triazine ring, a pyrimidine ring, a pyridazine ring, or a pyrazine ring is more preferable, further an S-triazine ring is most preferable.

$m_1$ is an integer of 0 to 3. When a —OM group may be substituted on a structure of a preferable example of the 5- to 8-membered nitrogen-containing heterocyclic ring represented by G, $m_1$ is preferably from 0 to 2. Among the above, $m_1$ is preferably 0 or 1, and particularly $m_1=1$ is most preferable.

Hereinafter, the M will be described in more detail.

M represents a hydrogen atom or cation.

The cation represented by M includes an alkali metal ion, ammonium, and quaternary ammonium cation, and preferably Li, Na, K, $NH_4$ or $NR_4$. R includes an alkyl group and an aryl group, and the examples thereof are the same as the examples of the alkyl group and the aryl group represented by R and Y. Among the above, preferable examples of M include Li, Na, K, and $NH_4$, further, Li, Na, or K is particularly preferable.

As the combination of the preferable substituents of the dye represented by Formula (Y-1) of the invention, a compound in which at least one of various substituents is the above mentioned preferable group is preferable, a compound in which a larger number of various substituents are the above mentioned preferable groups is more preferable, and a compound in which all the substituents are the above mentioned preferable groups is most preferable.

The particularly preferable combinations for the dye represented by Formula (Y-1) of the invention include the following (A) to (G):

(A) $R_1$ and $R_2$ may be the same or different from each other, and preferable examples thereof include a substituted or unsubstituted alkyl group having a total number of carbon atoms of from 1 to 12, a substituted or unsubstituted aryl group having a total number of carbon atoms of from 6 to 18, and a substituted or unsubstituted heterocyclic group having a total number of carbon atoms of from 4 to 12. Among the above, a straight or branched chain alkyl group having a total number of carbon atoms of from 1 to 8 is preferable, a secondary or tertiary alkyl group is particularly preferable, and a t-butyl group is most preferable.

(B) $X_1$ and $X_2$ may be the same or different from each other, and preferably $X_1$ and $X_2$ each independently represent an electron attracting group with a Hammett's substituent constant δp value of 0.20 or more. Further, an electron attracting group with a δp value of 0.30 or more is preferable. An electron attracting group with a δp value of 1.0 or less is the upper limit. Among the above, a cyano group, an alkylsulfonyl group having 1 to 12 carbon atoms, an arylsulfonyl group having 6 to 18 carbon atoms, or a sulfamoyl group having 0 to 12 carbon atoms is preferable, and a cyano group or an alkylsulfonyl group having 1 to 12 carbon atoms is most preferable.

(C) $Y_1$ and $Y_2$ may be the same or different from each other, and preferable examples thereof include a hydrogen atom, a substituted or unsubstituted alkyl group having a total number of carbon atoms of from 1 to 12, a substituted or unsubstituted aryl group having a total number of carbon atoms of from 6 to 18, and a substituted or unsubstituted heterocyclic group having a total number of carbon atoms of from 4 to 12. Further, a hydrogen atom or a substituted or unsubstituted alkyl group is more preferable. Among the above, a hydrogen atom is most preferable.

(D) $Z_1$ and $Z_2$ may be the same or different from each other, and preferable examples thereof include a substituted or unsubstituted alkyl group having a total number of carbon atoms of from 1 to 12, a substituted or unsubstituted aryl group having a total number of carbon atoms of from 6 to 18, and a substituted or unsubstituted heterocyclic group having a total number of carbon atoms of from 4 to 12. Further, a substituted or unsubstituted aryl group or a substituted or unsubstituted heterocyclic group is more preferable. In particular, a substituted aryl group is most preferable.

(E) G represents an atomic group forming a 5- to 8-membered nitrogen-containing heterocyclic ring. Preferable examples of the 5- to 8-membered nitrogen-containing heterocyclic ring include an S-triazine ring, a pyrimidine ring, a pyridazine ring, a pyrazine ring, a pyridine ring, an imidazole ring, a pyrazole ring, and a pyrrole ring. Among the above, an S-triazine ring, a pyrimidine ring, a pyridazine ring, or a pyrazine ring is more preferable, and an S-triazine ring is most preferable.

(F) $m_1$ is an integer from 0 to 3. When a —OM group may be substituted to a structure of a preferable example of the 5- to 8-membered nitrogen-containing heterocyclic ring represented by G, $m_1$ is preferably from 0 to 2. Among the above, $m_1$ is preferably 0 or 1, and particularly $m_1=1$ is most preferable.

(G) M is preferably a hydrogen atom or a cation, particularly preferably a hydrogen atom, an alkali metal ion, or an ammonium or quaternary ammonium cation, and more preferably Li, Na, K, or $NH_4$.

Hereinafter, Formula (Y-2) will be described in detail.

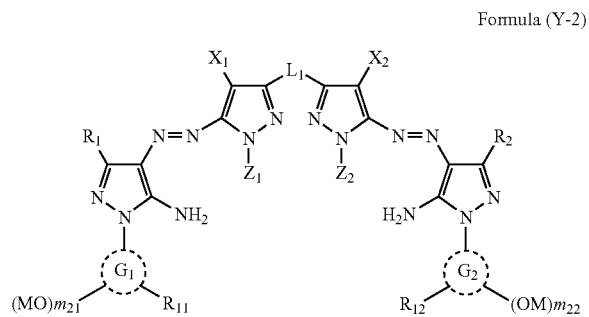

Formula (Y-2)

$R_1$, $R_2$, $R_{11}$, $R_{12}$, $X_1$, $X_2$, $Z_1$, and $Z_2$ each represent a monovalent group.

The monovalent group represents a hydrogen atom or a monovalent substituent.

$L_1$ represents a divalent linking group.

$G_1$ and $G_2$ each independently represent an atomic group forming a 5- to 8-membered nitrogen-containing heterocyclic ring.

$m_{21}$ and $m_{22}$ each independently represent an integer from 0 to 3. When a —OM group may be substituted to a structure of a preferable example of the 5- to 8-membered nitrogen-containing heterocyclic ring represented by $G_1$ or $G_2$, $m_{21}$ and $m_{22}$ each independently is preferably from 0 to 2 and more preferably 0 or 1. In particular, it is most preferable that $m_{21}$ is 1 and $m_{22}$ is also 1.

M represents a hydrogen atom or cation.

Hereinafter, Formula (Y-2) mentioned above will be described in more detail.

In Formula (Y-2), preferable examples of the substituents of $R_1$ and $R_2$ are the same as the examples of the substituents of $R_1$, $R_2$, $Y_1$, and $Y_2$ described for Formula (Y-1), and preferable examples thereof are also the same.

In Formula (Y-2), preferable examples of the substituents of $X_1$ and $X_2$ are the same as the examples of the substituents of $X_1$ and $X_2$ described for Formula (Y-1), and preferable examples thereof are also the same.

In Formula (Y-2), preferable examples of the substituents of $Z_1$ and $Z_2$ are the same as the examples of the substituents of $Z_1$ and $Z_2$ described for Formula (Y-1), and preferable examples thereof are also the same.

In Formula (Y-2), preferable examples of $G_1$ and $G_2$ are the same as the examples of G described for Formula (Y-1), and preferable examples thereof are also the same.

In Formula (Y-2), $m_{21}$ and $m_{22}$ each independently represent an integer from 0 to 3. When a —OM group may be substituted to a structure of a preferable example of the 5- to 8-membered nitrogen-containing heterocyclic ring represented by $G_1$ or $G_2$, $m_{21}$ and $m_{22}$ each independently is preferably from 0 to 2 and more preferably 0 or 1. In particular, it is most preferable that $m_{21}$ is 1 and $m_{22}$ is also 1.

In Formula (Y-2), preferable examples of M are the same as the examples of M described for Formula (Y-1), and preferable examples thereof are also the same.

In Formula (Y-2), preferable examples of the substituents of $R_{11}$ and $R_{12}$ are the same as the examples of the substituents of $R_1$, $R_2$, $Y_1$, and $Y_2$ described for Formula (Y-1). Preferable examples thereof include a —OM group (wherein M is a hydrogen atom or cation), a substituted or unsubstituted amino group; an alkylamino group having 1 to 12 carbon atoms, an arylamino group having 6 to 18 carbon atoms, a substituted or unsubstituted alkylthio group having 1 to 12 carbon atoms, and a substituted or unsubstituted arylthio group having 6 to 18 carbon atoms.

In Formula (Y-2), the divalent linking group represented by $L_1$ is preferably an alkylene group (e.g., methylene, ethylene, propylene, butylene, or pentylene), an alkenylene group (e.g., ethenylene or propenylene), an alkynylene group (e.g., ethynylene or propynylene), an arylene group (e.g., phenylene or naphthylene), a divalent heterocyclic group (e.g., a 6-chloro-1,3,5-triazine-2,4-diyl group, a pyrimidine-2,4-diyl group, a pyrimidine-4,6-diyl group, a quinoxaline-2,3-diyl group, or a pyridazine-3,6-diyl), —O—, —CO—, —NR— (wherein R is a hydrogen atom, an alkyl group, or an aryl group), —S—, —$SO_2$—, —SO—, or a combination thereof (e.g., —$NHCH_2CH_2NH$—, —NHCONH—, and the like).

An alkylene group, an alkenylene group, an alkynylene group, an arylene group, a divalent heterocyclic group, or an alkyl group or an aryl group of R may each have a substituent.

Examples of the substituent are the same as the substituents of $R_1$, $R_2$, $Y_1$, and $Y_2$ in Formula (Y-1).

The alkyl group and the aryl group of the R are the same as the examples of the substituents of $R_1$, $R_2$, $Y_1$, and $Y_2$ in Formula (Y-1).

More preferable examples of the divalent linking group include an alkylene group having 10 or less carbon atoms, an alkenylene group having 10 or less carbon atoms, an alkynylene group having 10 or less carbon atoms, an arylene group having 6 to 10 carbon atoms, —S—, —SO—, —$SO_2$—, or a combination thereof (e.g., —$SCH_2CH_2S$—, —$SCH_2CH_2CH_2S$—, and the like).

The total number of carbon atoms of the divalent linking group is preferably 0 to 50, more preferably 0 to 30, and most preferably 0 to 10.

As the combination of the preferable substituents of the dye represented by Formula (Y-2) of the invention, a compound in which at least one of various substituents is the above mentioned preferable group is preferable, a compound in which a larger number of various substituents are the above mentioned preferable groups is more preferable, and a compound in which all the substituents are the above mentioned preferable substituents is most preferable.

The particularly preferable combinations for the dye represented by Formula (Y-2) of the invention include the following (A) to (H):

(A) $R_1$ and $R_2$ may be the same or different from each other, and preferable examples thereof include a substituted or unsubstituted alkyl group having a total number of carbon atoms of from 1 to 12, a substituted or unsubstituted aryl group having a total number of carbon atoms of from 6 to 18, and a substituted or unsubstituted heterocyclic group having a total number of carbon atoms of from 4 to 12. Among the above, a straight or branched chain alkyl group having a total number of carbon atoms of from 1 to 8 is more preferable, a secondary or tertiary alkyl group is particularly preferable, and a t-butyl group is most preferable.

(B) $X_1$ and $X_2$ may be the same or different from each other and preferably $X_1$ and $X_2$ each independently represent an electron attracting group with a Hammett's substituent constant δp value of 0.20 or more is preferable. An electron attracting group with a δp value of 0.30 or more is more preferable. An electron attracting group with a δp value of 1.0 or less is the upper limit. Among the above, a cyano group, an alkylsulfonyl group having 1 to 12 carbon atoms, an arylsulfonyl group having 6 to 18 carbon atoms, or a sulfamoyl group having 0 to 12 carbon atoms is preferable, and a cyano group or an alkylsulfonyl group having 1 to 12 carbon atoms is most preferable.

(C) $Z_1$ and $Z_2$ may be the same or different from each other, and preferable examples thereof include a substituted or unsubstituted alkyl group having a total number of carbon atoms of from 1 to 12, a substituted or unsubstituted aryl group having a total number of carbon atoms of from 6 to 18, and a substituted or unsubstituted heterocyclic group having a total number of carbon atoms of from 4 to 12. A substituted or unsubstituted aryl group or a substituted or unsubstituted heterocyclic group is more preferable, and particularly, a substituted aryl group is most preferable.

(D) $G_1$ and $G_2$ may be the same or different from each other, and represents an atomic group forming a 5- to 8-membered nitrogen-containing heterocyclic ring. Preferable examples of the 5- to 8-membered nitrogen-containing heterocyclic ring include an S-triazine ring, a pyrimidine ring, a pyridazine ring, a pyrazine ring, a pyridine ring, an imidazole ring, a pyrazole ring, and a pyrrole ring. Among the above, an S-triazine ring, a pyrimidine ring, a pyridazine ring, or a pyrazine ring is more preferable, and an S-triazine ring is most preferable.

(E) $m_{21}$ and $m_{22}$ each independently represent an integer from 0 to 3. When a —OM group may be substituted on a structure of a preferable example of the 5- to 8-membered nitrogen-containing heterocyclic ring represented by $G_1$ or $G_2$, $m_{21}$ and $m_{22}$ each independently is preferably from 0 to 2 and more preferably 0 or 1. In particular, it is most preferable that $m_{21}$ is 1 and $m_{22}$ is also 1.

(F) M is preferably a hydrogen atom or a cation, particularly preferably a hydrogen atom, an alkali metal ion, or an ammonium or quaternary ammonium cation, and more preferably Li, Na, K, or $NH_4$.

(G) $R_{11}$ and $R_{12}$ may be the same or different from each other, and preferable examples thereof include a —OM group (wherein M is a hydrogen atom or cation), a substituted or unsubstituted amino group (an alkylamino group having 1 to 12 carbon atoms, an arylamino group having 6 to 18 carbon atoms, etc.), a substituted or unsubstituted alkylthio group having 1 to 12 carbon atoms, or a substituted or unsubstituted arylthio group having 6 to 18 carbon atoms. Among the above, an unsubstituted amino group, an alkylamino group having 1 to 12 carbon atoms, an arylamino group having 6 to 18 carbon atoms, a substituted or unsubstituted alkylthio group having 1 to 12 carbon atoms, or a substituted or unsubstituted arylthio group having 6 to 18 carbon atoms is preferable. In particular, an unsubstituted amino group, a dialkylamino group having 1 to 12 carbon atoms, an arylamino group having 6 to 18 carbon atoms, or a substituted or unsubstituted alkylthio group having 1 to 12 carbon atoms is more preferable.

(H) $L_1$ is preferably an alkylene group having 10 or less carbon atoms, an alkenylene group having 10 or less carbon atoms, an alkynylene group having 10 or less carbon atoms, an arylene group having 6 to 10 carbon atoms, —S—, —SO—, —$SO_2$—, or a combination thereof (e.g., —$SCH_2CH_2S$— or —$SCH_2CH_2CH_2S$—), more preferably an alkylene group having 10 or less carbon atoms, an arylene group having 6 to 10 carbon atoms, —S—, —SO—, —$SO_2$—, or a combination thereof (e.g., —$SCH_2CH_2S$— or —$SCH_2CH_2CH_2S$—), and particularly preferably an alkylene group having 10 or less carbon atoms, —$SCH_2CH_2S$—, or —$SCH_2CH_2CH_2S$—.

Hereinafter, Formula (Y-3) will be described in detail.

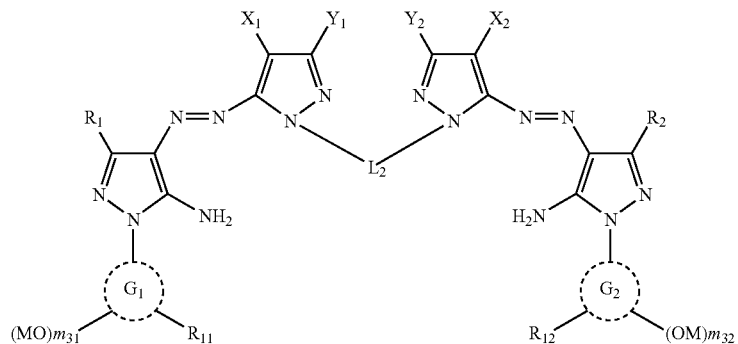

Formula (Y-3)

$R_1$, $R_2$, $R_{11}$, $R_{12}$, $X_1$, $X_2$, $Y_1$, and $Y_2$ each represent a monovalent group.

The monovalent group represents a hydrogen atom or a monovalent substituent.

$L_2$ represents a divalent linking group.

$G_1$ and $G_2$ each independently represent an atomic group forming a 5- to 8-membered nitrogen-containing heterocyclic ring.

$m_{31}$ and $m_{32}$ each independently represent an integer from 0 to 3.

M represents a hydrogen atom or a cation.

Hereinafter, Formula (Y-3) mentioned above will be described in more detail.

In Formula (Y-3), preferable examples of the substituents of $R_1$, $R_2$, $Y_1$, and $Y_2$ are the same as the examples of the substituents of $R_1$, $R_2$, $Y_1$, and $Y_2$ described for Formula (Y-1), and preferable examples thereof are also the same.

In Formula (Y-3), preferable examples of the substituents of $X_1$ and $X_2$ are the same as the examples of the substituents of $X_1$ and $X_2$ described for Formula (Y-1), and preferable examples thereof are also the same.

In Formula (Y-3), preferable examples of $G_1$ and $G_2$ are the same as the examples of G described for Formula (Y-1), and preferable examples thereof are also the same.

In Formula (Y-3), preferable examples of $m_{31}$ and $m_{32}$ are the same as the examples of $m_{31}$ and $m_{32}$ described for Formula (Y-2), and preferable examples thereof are also the same.

In Formula (Y-3), preferable examples of M are the same as the examples of M described for Formula (Y-1), and preferable examples thereof are also the same.

In Formula (Y-3), preferable examples of the substituents of $R_{11}$ and $R_{12}$ are the same as the examples of the substituents of $R_{11}$ and $R_{12}$ described for Formula (Y-2), and preferable examples thereof are also the same.

In Formula (Y-3), the divalent linking groups represented by $L_2$ are the same as the examples of $L_1$ described for Formula (Y-2), and the preferable examples thereof are also the same.

As the combination of the preferable substituents of the dye represented by Formula (Y-3) of the invention, a compound in which at least one of various substituents is the above mentioned preferable group is preferable, a compound in which a larger number of various substituents are the above mentioned preferable groups is more preferable, and a compound in which all the substituents are the above mentioned preferable substituents is most preferable.

The particularly preferable combinations for the dye represented by Formula (Y-3) of the invention include the following (A) to (H):

(A) $R_1$ and $R_2$ may be the same or different from each other. Preferable examples thereof include a substituted or unsubstituted alkyl group having a total number of carbon atoms of from 1 to 12, a substituted or unsubstituted aryl group having a total number of carbon atoms of from 6 to 18, and a substituted or unsubstituted heterocyclic group having a total number of carbon atoms of from 4 to 12. Among the above, a straight or branched chain alkyl group having a total number of carbon atoms of from 1 to 8 is preferable, a secondary or tertiary alkyl group is particularly preferable, and a t-butyl group is most preferable.

(B) $X_1$ and $X_2$ may be the same or different from each other. Preferably, $X_1$ and $X_2$ each independently represent an electron attracting group with a Hammett's substituent constant $\delta p$ value of 0.20 or more. Further, an electron attracting group with a $\delta p$ value of 0.30 or more is more preferable. An electron attracting group with a $\delta p$ value of 1.0 or less is the upper limit. Among the above, a cyano group, an alkylsulfonyl group having 1 to 12 carbon atoms, an arylsulfonyl group having 6 to 18 carbon atoms, or a sulfamoyl group having 0 to 12 carbon atoms is preferable, and a cyano group or an alkylsulfonyl group having 1 to 12 carbon atoms is most preferable.

(C) $Y_1$ and $Y_2$ may be the same or different from each other. Preferable examples thereof include a hydrogen atom, a substituted or unsubstituted alkyl group having a total number of carbon atoms of from 1 to 12, a substituted or unsubstituted aryl group having a total number of carbon atoms of from 6 to 18, and a substituted or unsubstituted heterocyclic group having a total number of carbon atoms of from 4 to 12. A hydrogen atom or a substituted or unsubstituted alkyl group is more preferable. Among the above, a hydrogen atom is most preferable.

(D) $G_1$ and $G_2$ may be the same or different from each other, and represents an atomic group forming a 5- to 8-membered nitrogen-containing heterocyclic ring. Preferable examples of the 5- to 8-membered nitrogen-containing heterocyclic ring include an S-triazine ring, a pyrimidine ring, a pyridazine ring, a pyrazine ring, a pyridine ring, an imidazole ring, a pyrazole ring, and a pyrrole ring. Among the above, an S-triazine ring, a pyrimidine ring, a pyridazine ring, or a pyrazine ring is more preferable, and an S-triazine ring is most preferable.

(E) $m_{31}$ and $m_{32}$ each independently represent an integer from 0 to 3. When a —OM group may be substituted to a structure of a preferable example of the 5- to 8-membered nitrogen-containing heterocyclic ring represented by $G_1$ or $G_2$, $m_{31}$ and $m_{32}$ each independently is preferably from 0 to 2 and more preferably 0 or 1. In particular, it is most preferable that $m_{31}$ is 1 and $m_{32}$ is also 1.

(F) M is preferably a hydrogen atom or a cation, particularly preferably a hydrogen atom, an alkali metal ion, or an ammonium or quaternary ammonium cation, and more preferably Li, Na, K, or $NH_4$.

(G) $R_{11}$ and $R_{12}$ may be the same or different from each other. Preferable examples thereof include a —OM group (M represents a hydrogen atom or cation), a substituted or unsubstituted amino group (an alkylamino group having 1 to 12 carbon atoms, an arylamino group having 6 to 18 carbon atoms, etc.), a substituted or unsubstituted alkylthio group having 1 to 12 carbon atoms, or a substituted or unsubstituted arylthio group having 6 to 18 carbon atoms. Among the above, an unsubstituted amino group, an alkylamino group having 1 to 12 carbon atoms, an arylamino group having 6 to 18 carbon atoms, a substituted or unsubstituted alkylthio group having 1 to 12 carbon atoms, or a substituted or unsubstituted arylthio group having 6 to 18 carbon atoms is preferable. In particular, an unsubstituted amino group, a dialkylamino group having 1 to 12 carbon atoms, an arylamino group having 6 to 18 carbon atoms, or a substituted or unsubstituted alkylthio group having 1 to 12 carbon atoms is more preferable.

(H) $L_2$ is preferably an alkylene group having 10 or less carbon atoms, an alkenylene group having 10 or less carbon atoms, an alkynylene group having 10 or less carbon atoms, an arylene group having 6 to 10 carbon atoms, —S—, —SO—, —$SO_2$—, or a combination thereof (e.g., —$SCH_2CH_2S$— or —$SCH_2CH_2CH_2S$—), more preferably an alkylene group having 10 or less carbon atoms, an arylene group having 6 to 10 carbon atoms, —S—, —SO—, —$SO_2$—, or a combination thereof (e.g., —$SCH_2CH_2S$— or —$SCH_2CH_2CH_2S$—), and particularly preferably an alkylene group having 10 or less carbon atoms, —$SCH_2CH_2S$—, or —$SCH_2CH_2CH_2S$—.

Hereinafter, Formula (Y-4) will be described in detail.

Formula (Y-4)

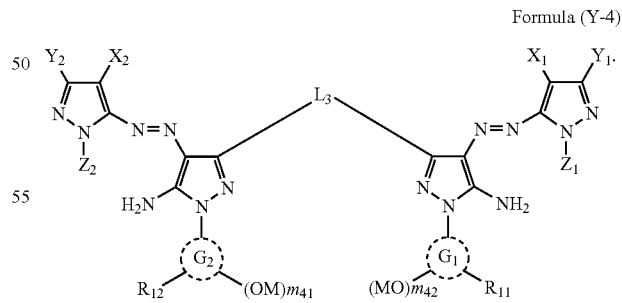

$R_{11}$, $R_{12}$, $X_1$, $X_2$, $Y_1$, and $Y_2$ represent a monovalent group. The monovalent group represents a hydrogen atom or a monovalent substituent.

$L_3$ represents a divalent linking group.

$G_1$ and $G_2$ each independently represent an atomic group forming a 5- to 8-membered nitrogen-containing heterocyclic ring.

$m_{41}$ and $m_{42}$ each independently represent an integer from 0 to 3.

M represents a hydrogen atom or a cation.

Hereinafter, Formula (Y-4) mentioned above will be described in more detail.

In Formula (Y-4), preferable examples of the substituents of $Y_1$ and $Y_2$ are the same as the examples of the substituents of $R_1$, $R_2$, $Y_1$, and $Y_2$ described for Formula (Y-1), and preferable examples thereof are also the same.

In Formula (Y-4), preferable examples of the substituents of $X_1$ and $X_2$ are the same as the examples of the substituents of $X_1$ and $X_2$ described for Formula (Y-1), and preferable examples thereof are also the same.

In Formula (Y-4), preferable examples of $G_1$ and $G_2$ are the same as the examples of G described for Formula (Y-1), and preferable examples thereof are also the same.

In Formula (Y-4), preferable examples of $m_{41}$ and $m_{42}$ are the same as the examples of $m_{21}$ and $m_{22}$ described for Formula (Y-2), and preferable examples thereof are also the same.

In Formula (Y-4), preferable examples of M are the same as the examples of M described for Formula (Y-1), and preferable examples thereof are also the same.

In Formula (Y-4), preferable examples of the substituents of $R_{11}$ and $R_{12}$ are the same as the examples of the substituents of $R_{11}$ and $R_{12}$ described for Formula (Y-2), and preferable examples thereof are also the same.

In Formula (Y-4), the divalent linking groups represented by $L_3$ are the same as the examples of $L_1$ described for Formula (Y-2), and the preferable examples thereof are also the same.

As the combination of the preferable substituents of the dye represented by Formula (Y-4) of the invention, a compound in which at least one of various substituents is the above mentioned preferable group is preferable, a compound in which a larger number of various substituents are the above mentioned preferable groups is more preferable, and a compound in which all the substituents are the above mentioned preferable substituents is most preferable.

The particularly preferable combinations for the dye represented by Formula (Y-4) of the invention include the following (A) to (H):

(A) $Y_1$ and $Y_2$ may be the same or different from each other. Preferable examples thereof include a hydrogen atom, a substituted or unsubstituted alkyl group having a total number of carbon atoms of from 1 to 12, a substituted or unsubstituted aryl group having a total number of carbon atoms of from 6 to 18, and a substituted or unsubstituted heterocyclic group having a total number of carbon atoms of from 4 to 12. Further, a hydrogen atom or a substituted or unsubstituted alkyl group is preferable. Among the above, a hydrogen atom is most preferable.

(B) $X_1$ and $X_2$ may be the same or different from each other. Preferably, $X_1$ and $X_2$ each independently represent an electron attracting group with a Hammett's substituent constant $\delta p$ value of 0.20 or more. An electron attracting group with a $\delta p$ value of 0.30 or more is more preferable. An electron attracting group with a $\delta p$ value of 1.0 or less is the upper limit. Among the above, a cyano group, an alkylsulfonyl group having 1 to 12 carbon atoms, an arylsulfonyl group having 6 to 18 carbon atoms, or a sulfamoyl group having 0 to 12 carbon atoms is preferable, and a cyano group or an alkylsulfonyl group having 1 to 12 carbon atoms is most preferable.

(C) $Z_1$ and $Z_2$ may be the same or different from each other. Preferable examples thereof include a substituted or unsubstituted alkyl group having a total number of carbon atoms of from 1 to 12, a substituted or unsubstituted aryl group having a total number of carbon atoms of from 6 to 18, and a substituted or unsubstituted heterocyclic group having a total number of carbon atoms of from 4 to 12. Further, a substituted or unsubstituted aryl group or a substituted or unsubstituted heterocyclic group is preferable, and particularly, a substituted aryl group is most preferable.

(D) $G_1$ and $G_2$ may be the same or different from each other, and represents an atomic group forming a 5- to 8-membered nitrogen-containing heterocyclic ring. Preferable examples of the 5- to 8-membered nitrogen-containing heterocyclic ring include an S-triazine ring, a pyrimidine ring, a pyridazine ring, a pyrazine ring, a pyridine ring, an imidazole ring, a pyrazole ring, and a pyrrole ring. Among the above, an S-triazine ring, a pyrimidine ring, a pyridazine ring, or a pyrazine ring is more preferable, and an S-triazine ring is most preferable.

(E) $m_{41}$ and $m_{42}$ each independently represent an integer from 0 to 3. When a —OM group may be substituted on a structure of a preferable example of a 5- to 8-membered nitrogen-containing heterocyclic ring represented by $G_1$ or $G_2$, $m_{41}$ and $m_{42}$ each independently is preferably from 0 to 2 and more preferably 0 or 1. In particular, it is most preferable that $m_{41}$ is 1 and $m_{42}$ is also 1.

(F) M is preferably a hydrogen atom or a cation, particularly preferably a hydrogen atom, an alkali metal ion, or an ammonium or quaternary ammonium cation, and more preferably Li, Na, K, or $NH_4$.

(G) $R_{11}$ and $R_{12}$ may be the same or different from each other. Preferable examples thereof include a —OM group (M represents a hydrogen atom or cation), a substituted or unsubstituted amino group (an alkylamino group having 1 to 12 carbon atoms, an arylamino group having 6 to 18 carbon atoms, etc.), a substituted or unsubstituted alkylthio group having 1 to 12 carbon atoms, and a substituted or unsubstituted arylthio group having 6 to 18 carbon atoms. Among the above, an unsubstituted amino group, an alkylamino group having 1 to 12 carbon atoms, an arylamino group having 6 to 18 carbon atoms, a substituted or unsubstituted alkylthio group having 1 to 12 carbon atoms, or a substituted or unsubstituted arylthio group having 6 to 18 carbon atoms is preferable. In particular, an unsubstituted amino group, a dialkylamino group having 1 to 12 carbon atoms, an arylamino group having 6 to 18 carbon atoms, or a substituted or unsubstituted alkylthio group having 1 to 12 carbon atoms is more preferable.

(H) $L_3$ is preferably an alkylene group having 10 or less carbon atoms, an alkenylene group having 10 or less carbon atoms, an alkynylene group having 10 or less carbon atoms, an arylene group having 6 to 10 carbon atoms, —S—, —SO—, —$SO_2$—, or a combination thereof (e.g., —$SCH_2CH_2S$— or —$SCH_2CH_2CH_2S$—), more preferably an alkylene group having 10 or less carbon atoms, an arylene group having 6 to 10 carbon atoms, —S—, —SO—, —$SO_2$—, or a combination thereof (e.g., —$SCH_2CH_2S$— or —$SCH_2CH_2CH_2S$—), and particularly preferably an alkylene group having 10 or less carbon atoms, —$SCH_2CH_2S$—, or —$SCH_2CH_2CH_2S$—.

Hereinafter, Formula (Y-5) will be described in detail.

Formula (Y-5)

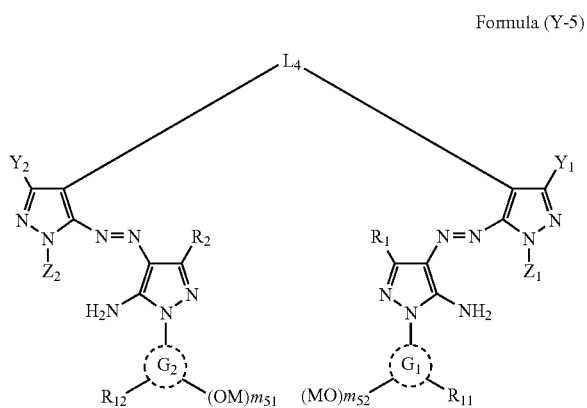

$R_1$, $R_2$, $R_{11}$, $R_{12}$, $Y_1$, $Y_2$, $Z_1$, and $Z_2$ represent a monovalent group.

The monovalent group represents a hydrogen atom or a monovalent substituent.

$L_4$ represents a divalent linking group.

$G_1$ and $G_2$ each independently represent an atomic group forming a 5- to 8-membered nitrogen-containing heterocyclic ring.

$m_{51}$ and $m_{52}$ each independently represent an integer from 0 to 3.

M represents a hydrogen atom or a cation.

Hereinafter, Formula (Y-5) mentioned above will be described in more detail.

In Formula (Y-5), preferable examples of the substituents of $R_1$, $R_2$, $Y_1$, and $Y_2$ are the same as the examples of the substituents of $R_1$, $R_2$, $Y_1$, and $Y_2$ described for Formula (Y-1), and preferable examples thereof are also the same.

In Formula (Y-5), preferable examples of the substituents of $Z_1$ and $Z_2$ are the same as the examples of the substituents of $Z_1$ and $Z_2$ described for Formula (Y-1), and preferable examples thereof are also the same.

In Formula (Y-5), preferable examples of $G_1$ and $G_2$ are the same as the examples of G described for Formula (Y-1), and preferable examples thereof are also the same.

In Formula (Y-5), preferable examples of $m_{51}$ and $m_{52}$ are the same as the examples of $m_{21}$ and $m_{22}$ described for Formula (Y-1), and preferable examples thereof are also the same.

In Formula (Y-5), preferable examples of M are the same as the examples of M described for Formula (Y-2), and preferable examples thereof are also the same.

In Formula (Y-5), preferable examples of the substituents of $R_{11}$ and $R_{12}$ are the same as the examples of the substituents of $R_{11}$ and $R_{12}$ described for Formula (Y-2), and preferable examples thereof are also the same.

In Formula (Y-5), the divalent linking group represented by $L_4$ is the same as the examples of $L_1$ described for Formula (Y-2), and the preferable examples thereof are also the same.

As the combination of the preferable substituents of the dye represented by Formula (Y-5) of the invention, a compound in which at least one of various substituents is the above mentioned preferable group is preferable, a compound in which a larger number of various substituents are the above mentioned preferable groups is more preferable, and a compound in which all the substituents are the above mentioned preferable substituents is most preferable.

The particularly preferable combinations for the dye represented by Formula (Y-5) of the invention include the following (A) to (H):

(A) $R_1$ and $R_2$ may be the same or different from each other. Preferable examples thereof include a substituted or unsubstituted alkyl group having a total number of carbon atoms of from 1 to 12, a substituted or unsubstituted aryl group having a total number of carbon atoms of from 6 to 18, and a substituted or unsubstituted heterocyclic group having a total number of carbon atoms of from 4 to 12. Among the above, a straight or branched chain alkyl group having a total number of carbon atoms of from 1 to 8 is preferable, a secondary or tertiary alkyl group is particularly preferable, and a t-butyl group is most preferable.

(B) $Y_1$ and $Y_2$ may be the same or different from each other. Preferable examples thereof include a hydrogen atom, a substituted or unsubstituted alkyl group having a total number of carbon atoms of from 1 to 12, a substituted or unsubstituted aryl group having a total number of carbon atoms of from 6 to 18, and a substituted or unsubstituted heterocyclic group having a total number of carbon atoms of from 4 to 12. A hydrogen atom or a substituted or unsubstituted alkyl group is more preferable. Among the above, a hydrogen atom is most preferable.

(C) $Z_1$ and $Z_2$ may be the same or different from each other. A substituted or unsubstituted alkyl group having a total number of carbon atoms of from 1 to 12, a substituted or unsubstituted aryl group having a total number of carbon atoms of from 6 to 18, or a substituted or unsubstituted heterocyclic group having a total number of carbon atoms of from 4 to 12 is preferable. A substituted or unsubstituted aryl group or a substituted or unsubstituted heterocyclic group is more preferable. In particular, a substituted aryl group is most preferable.

(D) $G_1$ and $G_2$ may be the same or different, and represents an atomic group forming a 5- to 8-membered nitrogen-containing heterocyclic ring. Preferable examples of the 5- to 8-membered nitrogen-containing heterocyclic ring include an S-triazine ring, a pyrimidine ring, a pyridazine ring, a pyrazine ring, a pyridine ring, an imidazole ring, a pyrazole ring, and a pyrrole ring. Among the above, an S-triazine ring, a pyrimidine ring, a pyridazine ring, or a pyrazine ring is more preferable, and an S-triazine ring is most preferable.

(E) $m_{41}$ and $m_{42}$ each independently represent an integer of 0 to 3. When a —OM group may be substituted on a structure of a preferable example of the 5- to 8-membered nitrogen-containing heterocyclic ring represented by $G_1$ or $G_2$, $m_{41}$ and $m_{42}$ each independently is preferably from 0 to 2 and more preferably 0 or 1. In particular, it is most preferable that $m_{41}$ is 1 and $m_{42}$ is also 1.

(F) M is preferably a hydrogen atom or a cation, particularly preferably a hydrogen atom, an alkali metal ion, or an ammonium or quaternary ammonium cation, and more preferably Li, Na, K, or $NH_4$.

(G) $R_{11}$ and $R_{12}$ may be the same or different from each other. Preferable examples thereof include a —OM group (M represents a hydrogen atom or cation), a substituted or unsubstituted amino group; an alkylamino group having 1 to 12 carbon atoms, an arylamino group having 6 to 18 carbon atoms, a substituted or unsubstituted alkylthio group having 1 to 12 carbon atoms, or a substituted or unsubstituted arylthio group having 6 to 18 carbon atoms. Among the above, an unsubstituted amino group, an alkylamino group having 1 to 12 carbon atoms, an arylamino group having 6 to 18 carbon atoms, a substituted or unsubstituted alkylthio group having 1 to 12 carbon atoms, or a substituted or unsubstituted arylthio group having 6 to 18 carbon atoms is preferable. In particular, an unsubstituted amino group, a dialkylamino group having 1 to 12 carbon atoms, an arylamino group having 6 to 18 carbon atoms, or a substituted or unsubstituted alkylthio group having 1 to 12 carbon atoms is more preferable.

(H) $L_4$ is a divalent linking group, and preferably an electron attracting group with a Hammett's substituent constant $\delta p$ value of 0.20 or more, and more preferably an electron attracting group with a $\delta p$ value of 0.30 or more. $L_4$ is an electron attracting group with a $\delta p$ value of 1.0 or less as the upper limit. Among the above, an alkylsulfonyl group having 1 to 12 carbon atoms: $\{-SO_2-CH_2\}n\text{-}O_2S-$; n=integer of 1 to 10} or an arylsulfonyl group having 6 to 18 carbon atoms: $\{-SO_2-Ar-O_2S-$; preferably Ar is a substituted or unsubstituted aryl group) and most preferably, an alkylsulfonyl group having 1 to 12 carbon atoms: $\{-SO_2-(CH_2)n\text{-}O_2S-$; n=integer of 1 to 5}.

Among the azo dyes represented by Formula (Y-1), the dye represented by Formula (Y-6) is preferable.

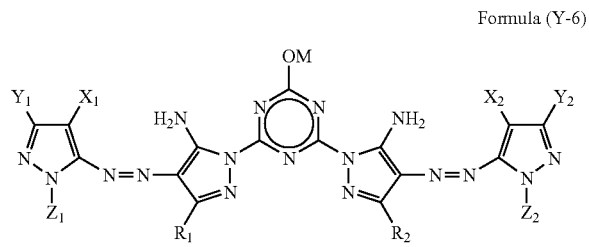

Formula (Y-6)

Hereinafter, Formula (Y-6) will be described in detail.

$R_1$, $R_2$, $Y_1$, and $Y_2$ each represent a monovalent group, $X_1$ and $X_2$ each independently represent an electron attracting group with a Hammett's substituent constant $\delta p$ value of 0.20 or more. $Z_1$ and $Z_2$ each independently represent a hydrogen atom, a substituted or unsubstituted alkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group. M represents a hydrogen atom or cation.

Hereinafter, $R_1$, $R_2$, $X_1$, $X_2$, $Y_1$, $Y_2$, $Z_1$, $Z_2$, and M will be described in detail.

Examples of the substituents of $R_1$, $R_2$, $Y_1$, and $Y_2$ are the same as the examples of the substituents of $R_1$, $R_2$, $Y_1$, and $Y_2$ described for Formula (Y-1), and preferable examples thereof are also the same.

Examples of the substituents of $X_1$ and $X_2$ are the same as the examples of the substituents of $X_1$ and $X_2$ described for Formula (Y-1), and preferable examples thereof are also the same.

Examples of the substituents of $Z_1$ and $Z_2$ are the same as the examples of the substituents of $Z_1$ and $Z_2$ described for Formula (Y-1), and preferable examples thereof are also the same.

Examples of M are the same as the examples of M described for Formula (Y-1), and preferable examples thereof are also the same.

As the combination of the preferable substituents of the dye represented by Formula (Y-6) of the invention, a compound in which at least one of various substituents is the above mentioned preferable group is preferable, a compound in which a larger number of various substituents are the above mentioned preferable groups is more preferable, and a compound in which all the substituents are the above mentioned preferable substituents is most preferable.

The particularly preferable combinations for the dye represented by Formula (Y-6) of the invention include the following (A) to (E):

(A) $R_1$ and $R_2$ may be the same or different from each other. Preferable examples thereof include a substituted or unsubstituted alkyl group having a total number of carbon atoms of from 1 to 12, a substituted or unsubstituted aryl group having a total carbon number of 6 to 18, and a substituted or unsubstituted heterocyclic group having a total number of carbon atoms of from 4 to 12. Among the above, a straight or branched chain alkyl group having a total number of carbon atoms of from 1 to 8 is preferable, a secondary or tertiary alkyl group is particularly preferable, and a t-butyl group is most preferable.

(B) $X_1$ and $X_2$ may be the same or different from each other. Preferably, $X_1$ and $X_2$ each independently represent an electron attracting group with a Hammett's substituent constant $\delta p$ value of 0.20 or more is preferable. An electron attracting group with a $\delta p$ value of 0.30 or more is more preferable. An electron attracting group with a $\delta p$ value of 1.0 or less is the upper limit. Among the above, a cyano group, an alkylsulfonyl group having 1 to 12 carbon atoms, an arylsulfonyl group having 6 to 18 carbon atoms, or a sulfamoyl group having 0 to 12 carbon atoms is preferable, and a cyano group or an alkylsulfonyl group having 1 to 12 carbon atoms is most preferable.

(C) $Y_1$ and $Y_2$ may be the same or different from each other. Preferably examples thereof include a hydrogen atom, a substituted or unsubstituted alkyl group having a total number of carbon atoms of from 1 to 12, a substituted or unsubstituted aryl group having a total number of carbon atoms of from 6 to 18, and a substituted or unsubstituted heterocyclic group having a total number of carbon atoms of from 4 to 12. A hydrogen atom or a substituted or unsubstituted alkyl group is preferable. Among the above, a hydrogen atom is most preferable.

(D) $Z_1$ and $Z_2$ may be the same or different from each other. Preferable examples thereof include a substituted or unsubstituted alkyl group having a total number of carbon atoms of from 1 to 12, a substituted or unsubstituted aryl group having a total number of carbon atoms of from 6 to 18, and a substituted or unsubstituted heterocyclic group having a total number of carbon atoms of from 4 to 12. Further, a substituted or unsubstituted aryl group or a substituted or unsubstituted heterocyclic group is preferable. In particular, a substituted aryl group is most preferable.

(E) M is preferably a hydrogen atom or a cation, particularly preferably a hydrogen atom, an alkali metal ion, ammonium, or quaternary ammonium cation, and more preferably Li, Na, K, or $NH_4$.

In the invention, when the compounds represented by Formulae (1), (Y-1), (Y-2), (Y-3), (Y-4), (Y-5), and (Y-6) are required to have hydrophilicity, each compound preferably has 2 or more ionic hydrophilic groups in the molecule, more preferably 2 to 10 ionic hydrophilic groups in the molecule, and particularly preferably 3 to 6 ionic hydrophilic groups in the molecule.

When water is not used as the medium, the compounds are not required to have an ionic hydrophilic group.

As the ionic hydrophilic group, any group is acceptable insofar as it is an ionic dissociation group. Specific examples may include a sulfo group, a carboxyl group (including salts thereof), a hydroxyl group (which may be in the form of a salt), a phosphono group (which may be in the form of a salt), and quaternary ammonium.

A sulfo group, a carboxyl group, or a hydroxyl group (including salts thereof) is preferable. When the ionic hydrophilic group is a salt, preferable countercations may include an alkali metal (e.g., lithium, sodium, or potassium), ammonium, and an organic cation (e.g., pyridinium, tetramethyl ammonium, or guadinium). Among the above, an alkali metal is preferable. In particular, in the case of a sulfo group, a lithium salt is preferable, and in the case of a carboxyl group, a sodium salt and/or a potassium salt are/is preferable.

As the combination of the preferable substituents of the dye represented by Formula (Y-6) of the invention, a compound in which at least one of various substituents is the above mentioned preferable group is preferable, a compound in which a larger number of various substituents are the above mentioned preferable groups is more preferable, and a compound in which all the substituents are the above mentioned preferable substituents is most preferable.

In the invention, among the compounds represented by Formula (Y-6), the compound represented by Formula (Y-6-I) is preferable.

(including salts thereof) and that at least one of $W_{21}$, $W_{22}$, $W_{23}$, $W_{24}$, and $W_{25}$ is a sulfo group (including salts thereof) or a carboxyl group (including salts thereof).

In the invention, in Formula (Y-6-I), $X_1$ and $X_2$ are the same as $X_1$ and $X_2$ in Formula (Y-6), and preferable examples thereof are also the same.

In the invention, in Formula (Y-6-I), $Y_1$ and $Y_2$ are the same as $Y_1$ and $Y_2$ in Formula (Y-6), and preferable examples thereof are also the same.

In the invention, in Formula (Y-6-I), $R_1$ and $R_2$ are the same as $R_1$ and $R_2$ in Formula (Y-6), and preferable examples thereof are also the same.

In the invention, in Formula (Y-6-I), M is the same as M in Formula (Y-6), and preferable examples thereof are also the same.

Formula (Y-6-1)

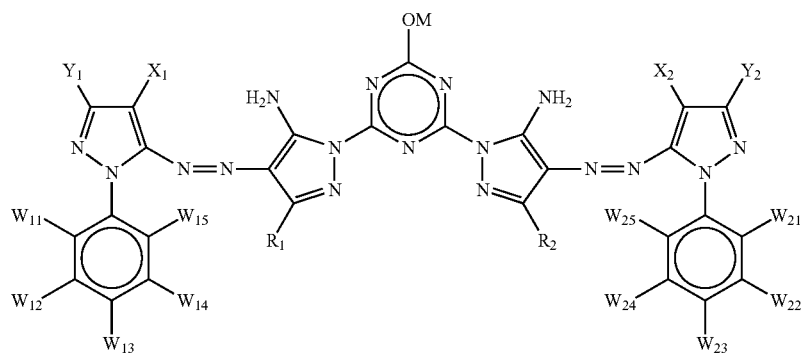

In Formula (Y-6-I), $R_1$, $R_2$, $Y_1$, $Y_2$, $W_{11}$, $W_{12}$, $W_{13}$, $W_{14}$, $W_{15}$, $W_{21}$, $W_{22}$, $W_{23}$, $W_{24}$, and $W_{25}$ each represent a monovalent group, and $X_1$ and $X_2$ each independently represent an electron attracting group with a Hammett's substituent constant δp value of 0.20 or more. M represents a hydrogen atom or cation. At least one of $W_{11}$, $W_{12}$, $W_{13}$, $W_{14}$, $W_{15}$, $W_{21}$, $W_{22}$, $W_{23}$, $W_{24}$, and $W_{25}$ is an ionic hydrophilic group or a group having an ionic hydrophilic group as a substituent.

In the invention, Formula (Y-6-I) mentioned above will be described in detail.

In the invention, in Formula (Y-6-I), $W_{11}$, $W_{12}$, $W_{13}$, $W_{14}$, $W_{15}$, $W_{21}$, $W_{22}$, $W_{23}$, $W_{24}$, and $W_{25}$ are the same as the examples of the monovalent group described for $Y_1$, $Y_2$, $Z_1$, and $Z_2$ in Formula (Y-6).

Preferable $W_{11}$, $W_{12}$, $W_{13}$, $W_{14}$, $W_{15}$, $W_{21}$, $W_{22}$, $W_{23}$, $W_{24}$, and $W_{25}$ include a hydrogen atom, a halogen atom, an alkyl group, an aryl group, a heterocyclic group, a cyano group, an alkoxy group, an amide group, a ureido group, an alkylsulfonylamino group, an arylsulfonylamino group, a sulfamoyl group, an alkylsulfonyl group, an arylsulfonyl group, a carbamoyl group, an alkoxycarbonyl group, a sulfo group (including salts thereof), a carboxyl group (including salts thereof), a hydroxyl group (which may be in the form of a salt), a phosphono group (which may be in the form of a salt), and quaternary ammonium. Among the above, a hydrogen atom, a halogen atom, an alkyl group, a sulfo group (including salts thereof), a carboxyl group (including salts thereof), or a hydroxyl group (which may be in the form of a salt) (including salts thereof) is preferable. A hydrogen atom, a sulfo group (including salts thereof), or a carboxyl group (including salts thereof) is more preferable. In particular, it is preferable that at least one of $W_{11}$, $W_{12}$, $W_{13}$, $W_{14}$, and $W_{15}$ is a sulfo group (including salts thereof) or a carboxyl group The particularly preferable combinations for the compounds represented by Formula (Y-6-I) of the invention include the following (A) to (F):

(A) $R_1$ and $R_2$ may be the same or different from each other. Preferable examples thereof include a straight or branched chain alkyl group having a total number of carbon atoms of from 1 to 8, particularly preferably a secondary alkyl group or a tertiary alkyl group, and most preferably a t-butyl group.

(B) $X_1$ and $X_2$ may be the same or different from each other. Preferable examples thereof include a cyano group, an alkylsulfonyl group having 1 to 12 carbon atoms, an arylsulfonyl group having 6 to 18 carbon atoms, or a sulfamoyl group having 0 to 12 carbon atoms, and most preferably a cyano group.

(C) $Y_1$ and $Y_2$ may be the same or different from each other. Preferable examples thereof include a hydrogen atom, a substituted or unsubstituted alkyl group having a total number of carbon atoms of from 1 to 12, a substituted or unsubstituted aryl group having a total number of carbon atoms of from 6 to 18, or a substituted or unsubstituted heterocyclic group having a total number of carbon atoms of from 4 to 12, and more preferably a hydrogen atom or a substituted or unsubstituted alkyl group. Among the above, a hydrogen atom and a methyl group are most preferable.

(D) Examples of $W_{11}$, $W_{12}$, $W_{13}$, $W_{14}$, $W_{15}$, $W_{21}$, $W_{22}$, $W_{23}$, $W_{24}$, and $W_{25}$, include a hydrogen atom, a halogen atom, an alkyl group, a sulfo group (including salts thereof), a carboxyl group (including salts thereof), and a hydroxyl group (which may be in the form of a salt) (including salts thereof) is preferable. A hydrogen atom, a sulfo group (including salts thereof), or a carboxyl group (including salts thereof) is more preferable. In particular, it is preferable that at least one of $W_{11}$, $W_{12}$, $W_{13}$, $W_{14}$, and $W_{15}$ is a sulfo group (including salts thereof) or a carboxyl group (including salts thereof) and that at least one of $W_{21}$, $W_{22}$, $W_{23}$, $W_{24}$, and $W_{25}$ is a sulfo group (including salts thereof) or a carboxyl group (including salts thereof).

(E) M is preferably a hydrogen atom or a cation, particularly preferably a hydrogen atom, an alkali metal ion, or an ammonium or quaternary ammonium cation, and more preferably Li, Na, K, or $NH_4$.

(F) In the invention, the compound represented by Formulae (Y-3-I) preferably has 2 or more ionic hydrophilic groups in the molecule, more preferably 2 to 16 ionic hydrophilic groups in the molecule, and particularly preferably 3 to 5 ionic hydrophilic groups in the molecule.

As the ionic hydrophilic group, any group is acceptable insofar as it is an ionic dissociation group. Specific examples may include a sulfo group, a carboxyl group (including salts thereof), a hydroxyl group (which may be in the form of a salt), a phosphono group (which may be in the form of a salt), and quaternary ammonium. A sulfo group, a carboxyl group, or a hydroxyl group (including salts thereof) is preferable.

When the ionic hydrophilic group is a salt, preferable countercations may include an alkali metal (e.g., lithium, sodium, or potassium), ammonium, and organic cation (e.g., pyridinium, tetramethyl ammonium, or guadinium). Among the above, an alkali metal is preferable. In particular, in the case of a sulfo group, a lithium salt is preferable, and in the case of a carboxyl group, a sodium salt and/or a potassium salt are/is preferable.

As the combination of the preferable substituents of the dye represented by Formula (Y-6-I) of the invention, a compound in which at least one of various substituents is the above mentioned preferable group is preferable, a compound in which a larger number of various substituents are the above mentioned preferable groups is more preferable, and a compound in which all the substituents are the above mentioned preferable substituents is most preferable.

The water-soluble dyes represented by Formulae (Y-1), (Y-2), (Y-3), (Y-4), (Y-5), (Y-6), and (Y-6-I) preferably have a maximum absorption wavelength ($\lambda$max) of 380 to 490 nm in $H_2O$, more preferably a $\lambda$max of 400 to 480 nm, and particularly preferably a $\lambda$max of 420 to 460 nm from the viewpoint of color reproduction.

Preferable examples of the compound represented by Formula (1) include compounds described in JP-A No. 2007-138124, [0150] to [0470].

Preferable specific examples of the dye represented by Formula (1) will be shown below, but are not limited thereto.

Y-036

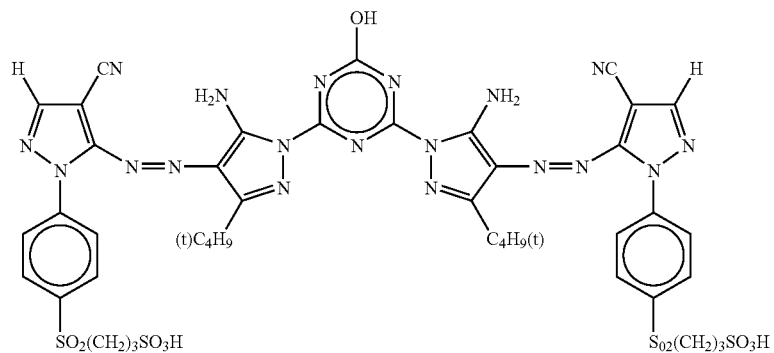

Y-037

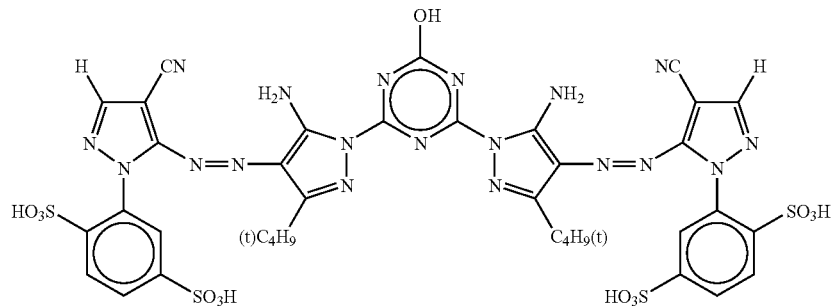

Y-038

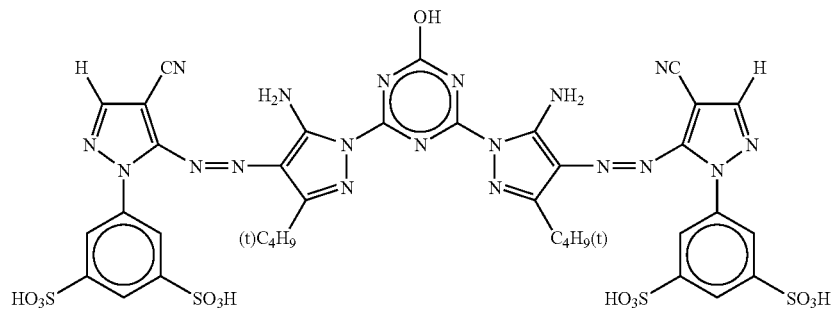

-continued
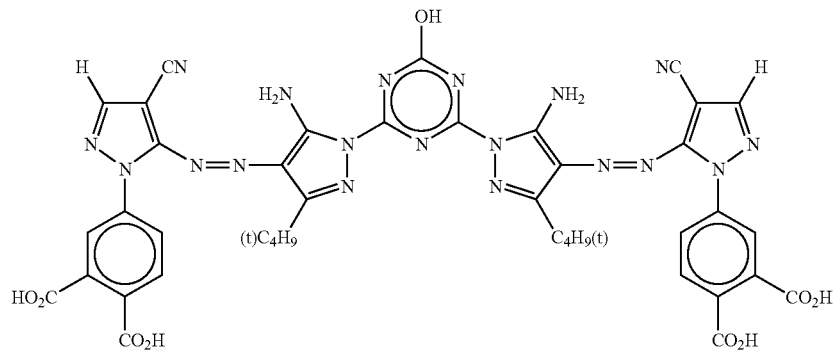
Y-O39
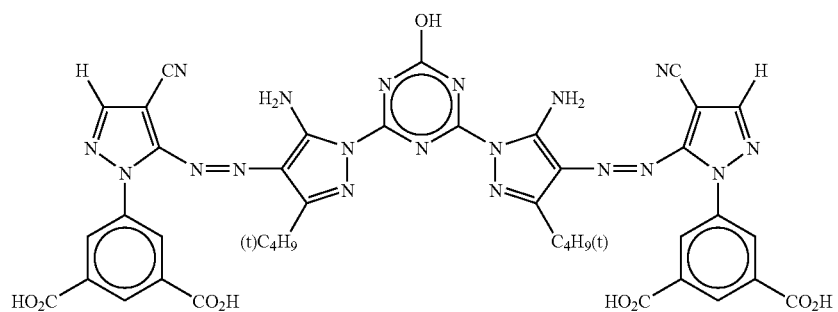
Y-040
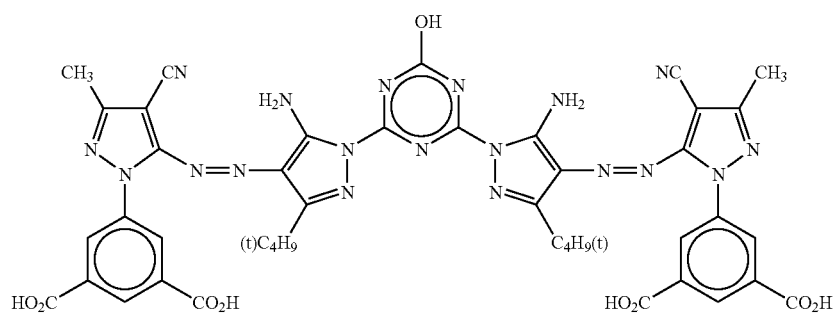
Y-041
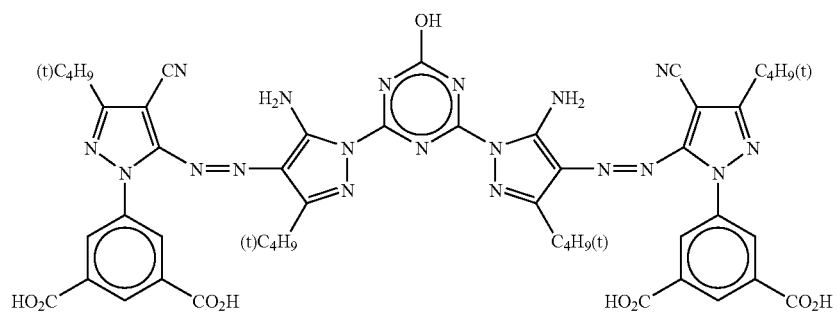
Y-042
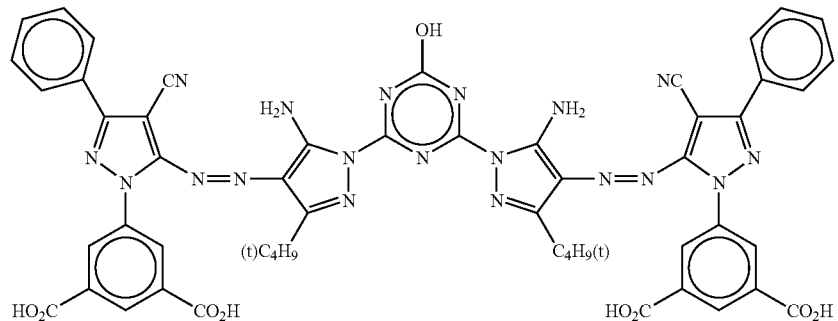
Y-043

-continued
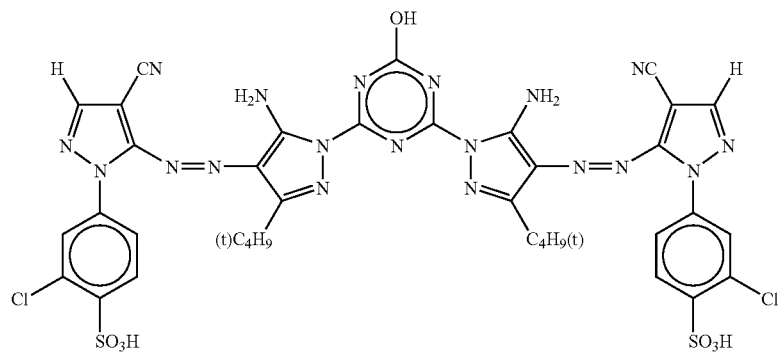
Y-044
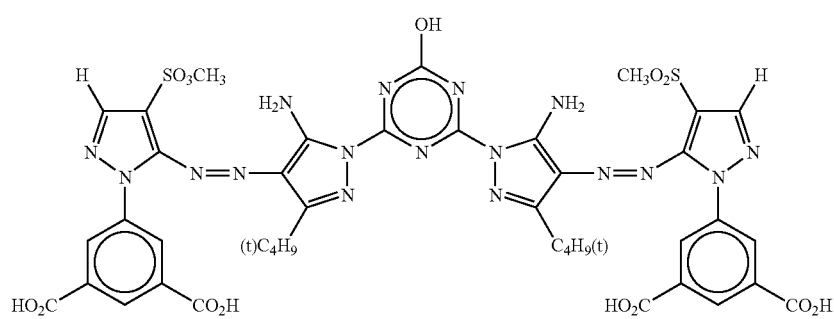
Y-045
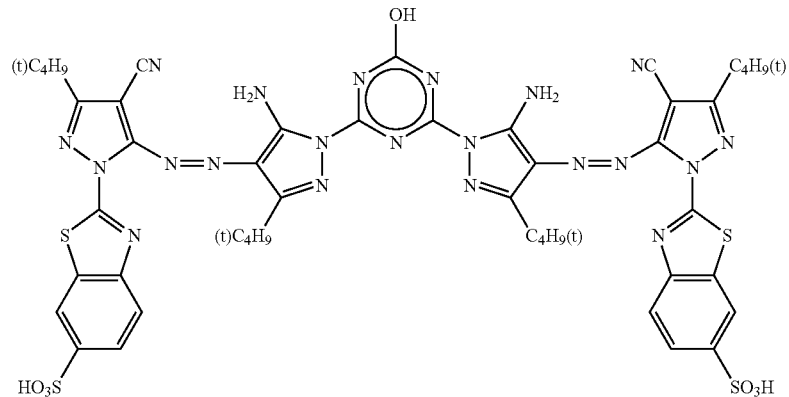
Y-046
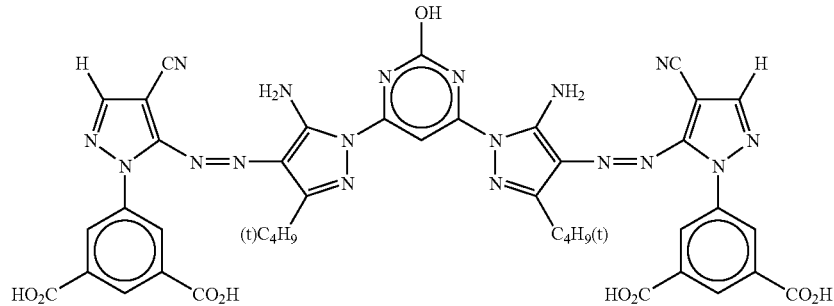
Y-047

-continued
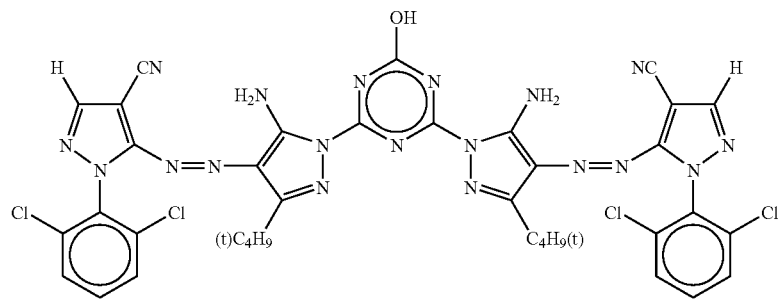
Y-048
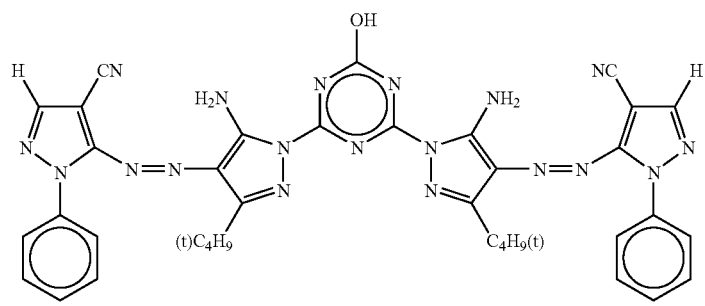
Y-049
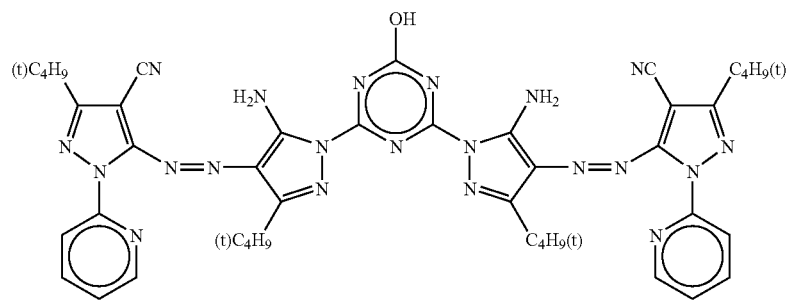
Y-050
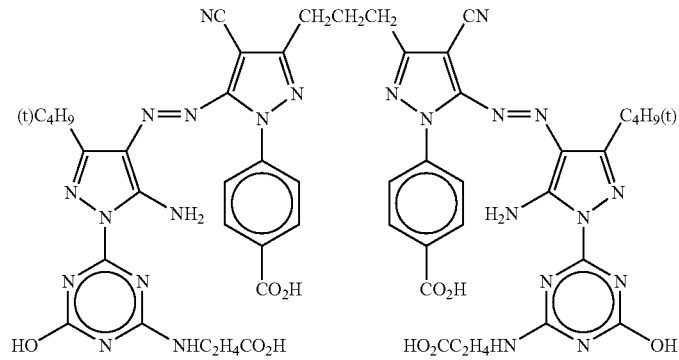
Y-051
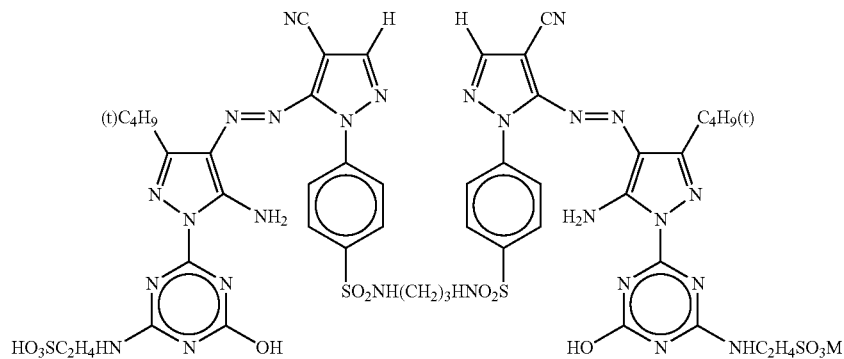
Y-052

-continued

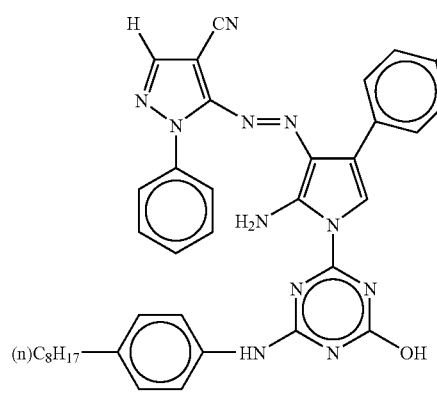
Y-053

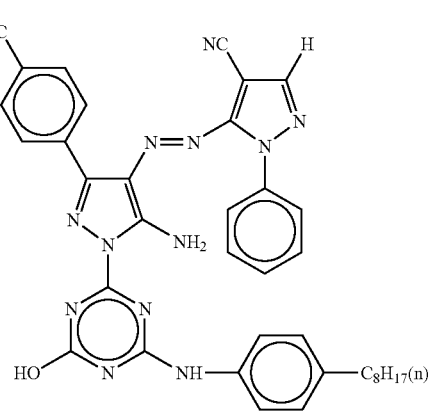

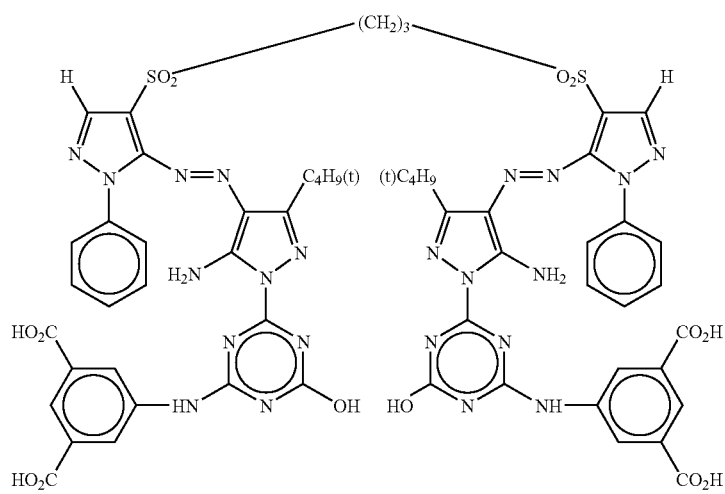
Y-054

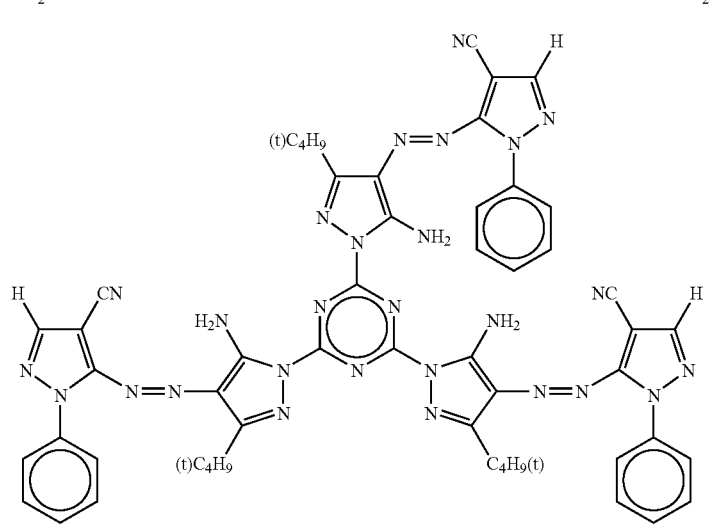
Y-055

The compound represented by Formula (1) may be a commercially-available compound and a compound produced by known production methods.

The ink composition of the invention may be produced by dissolving and/or dispersing the dye in a lipophilic medium or an aqueous medium. Preferably, an aqueous medium is used. As required, other additives may be contained in a range such that the effects of the invention are not adversely affected.

Examples of other additives include known additives, such as an anti-drying agent (wetting agent), an antifading agent, an emulsion stabilizer, a penetration accelerator, a UV absorber, an antiseptic agent, an antifungal agent, a pH adjuster, a surface tension adjuster, an antifoaming agent, a viscosity modifier, a dispersant, a dispersion stabilizer, a rust inhibitor, and a chelating agent. These various additives are directly added to an ink solution in the case of a water-soluble ink. When an oil-soluble dye is used in the form of a dispersion, it is generally added to the dispersion after preparation of a dye dispersion. However, it may be added to an oil phase or an aqueous phase during the preparation.

The anti-drying agent is preferably used for preventing clogging caused when the ink jet ink dries at an ink ejecting opening of a nozzle for use in an ink jet recording method.

As the anti-drying agent, a water-soluble organic solvent whose vapor pressure is lower than that of water is preferable. Specific example include polyhydric alcohols typified by ethylene glycol, propylene glycol, diethylene glycol, polyethylene glycol, thiodiglycol, dithio diglycol, 2-methyl-1,3-propanediol, 1,2,6-hexanetriol, acetylene glycol derivatives, glycerol, trimethylolpropane, etc.; lower alkyl ethers of polyhydric alcohols, such as ethylene glycol monomethyl (or ethyl) ether, diethylene glycol monomethyl (or ethyl) ether, and triethylene glycol monoethyl (or butyl) ether; heterocyclics, such as 2-pyrrolidone, N-methyl-2-pyrrolidone, 1,3-dimethyl-2-imidazolidinone, and N-ethylmorpholine; sulphur-containing compounds, such as sulfolane, dimethyl sulfoxide, and 3-sulfolene; polyifunctional compounds, such as diacetone alcohol and diethanolamine, and urea derivatives. Among the above, polyhydric alcohols, such as glycerol and diethylene glycol, are more preferable. The above-mentioned anti-drying agents may be used singly or in combination of two or more kinds. The anti-drying agents are preferably contained in the ink in a proportion of 10 to 50% by mass.

The penetration accelerator is used in order for an ink jet ink to permeate in paper in a better manner. Examples of the penetration accelerator may include alcohols, such as ethanol, isopropanol, butanol, di(tri)ethylene glycol monobutyl ether, and 1,2-hexanediol, sodium lauryl sulfate, sodium oleate, and a nonionic surfactant. When the penetration accelerators are contained in the ink in a proportion of 5 to 30% by mass, sufficient effects are obtained. It is preferable to add the penetration accelerators in a range such that printing blur and print through do not occur.

The UV absorber is used for increasing storageability of images. As the UV absorber, benzotriazole compounds described in JP-A Nos. 58-185677, 61-190537, 2-782, 5-197075, 9-34057, etc., benzophenone compounds described in JP-A Nos. 46-2784 and 5-194483, U.S. Pat. No. 3,214,463, etc., cinnamic acid compounds described in JP-B Nos. 48-30492 and 56-21141, JP-A No. 10-88106, etc., triazine compounds described in JP-A Nos. 4-298503, 8-53427, 8-239368, and 10-182621, JP-A (Translation of PCT Application) No. 8-501291, etc., compounds described in Research Disclosure No. 24239, and compounds which absorb ultraviolet rays to emit fluorescence, i.e., a so-called fluorescent brightening agent, typified stilbene compounds or benzoxazole compounds may be used.

The fading inhibitor is used for increasing storageability of images. As the fading inhibitor, various organic-based and metal complex-based fading inhibitors may be used. Examples of organic-based fading inhibitors include hydroquinones, alkoxyphenols, dialkoxyphenols, phenols, anilines, amines, indans, chromans, alkoxyanilines, and heterocyclics, and examples of metal complex-based fading inhibitors include a nickel complex and a zinc complex. More specifically, compounds described in patent publications cited in Research disclosure Nos. 17643 (VII-I or J), 15162, 18716, p. 650, left column, 36544, p. 527, 307105, p. 872, and 15162 or compounds included in compounds represented by Formulae of typical compounds and examples of the compounds described in JP-A 62-215272, pp. 127 to 137 may be used.

Examples of the antifungal agent include sodium dehydroacetate, sodium benzoate, sodium pyridinethione-1-oxide, ethyl p-hydroxybenzoate, and 1,2-benzisothiazoline-3-one, and salts thereof. The antifungal agents are preferably used in a proportion of 0.02 to 1.00% by mass in the ink.

As the pH adjustor, the neutralizer (an organic base, inorganic alkali) may be used. The pH adjustor is added for increasing storage stability of the ink jet ink in such a manner that the pH of the ink jet ink is preferably from 6 to 10, and more preferably from 7 to 10.

Examples of the surface tension adjuster include nonionic surfactants, cationic surfactants, and anionic surfactants. The surface tension of the ink jet ink of the invention is preferably from 25 to 70 mN/m, more preferably from 25 to 60 mN/m. The viscosity of the inkjet ink of the invention is preferably 30 mPa·s or lower. It is more preferable to adjust the viscosity of the ink jet ink to 20 mPa·s or lower. Preferable examples of the surfactant include anionic surfactants, such as fatty acid salt, alkyl sulfate, alkylbenzene sulfonate, alkylnaphthalene sulfonate, dialkyl sulfosuccinate, alkyl phosphate, a naphthalenesulfonic acid formalin condensate, and a polyoxyethylene alkyl sulfate and nonionic surfactants, such as polyoxyethylene alkyl ether, polyoxyethylene alkyl aryl ether, polyoxyethylene fatty acid ester, sorbitan fatty acid ester, polyoxyethylene sorbitan fatty acid ester, polyoxyethylene alkylamine, glycerine fatty acid ester, and an oxyethylene oxypropylene block copolymer. It is also preferable to use SURFYNOLS (product of Air Products & Chemicals Co.), which is an acetylene type polyoxyethylene oxide surfactant. It is also preferable to use an amineoxide type amphoteric surfactant, such as N,N-dimethyl-N-alkylamineoxide. Surfactants described in JP-A No. 59-157636, pp. 37 to 38 and Research Disclosure No. 308119 (1989) may be used.

As the defoaming agent, fluorine compounds, silicone compounds, and chelating agents typified by EDTA, etc., may be used, as required.

When the dye of the invention is oil soluble, as a method of dispersing the oil-soluble dye in an aqueous medium, it is preferable to disperse colored particles containing a dye and an oil-soluble polymer in an aqueous medium as described in JP-A No. 11-286637 and Japanese Patent Application Nos. 2000-78491, 2000-80259, and 2000-62370 or to disperse the dye of the invention which has been dissolved in a high boiling point organic solvent in an aqueous medium as described in Japanese Patent Application Nos. 2000-78454, 2000-78491, 2000-203856, and 2000-203857. As specific methods of dispersing the dye of the invention in an aqueous medium, an oil-soluble polymer to be used, a high-boiling organic solvent to be used, an additive to be used, and amounts thereof, those described in the above-mentioned patent publications may be preferably used. Alternatively, the dye may also be dispersed in the form of fine particles still in solid form. For dispersion, a dispersant or a surfactant is usable. As dispersing devices, there may be used a simple stirrer or impeller stirring system, an in-line stirring system, a mill system (such as a colloid mill, a ball mill, a sand mill, an attritor, a roll mill, or an agitator mill), an ultrasonic system, a high-pressure emulsifying and dispersing system (high-pressure homogenizer; as specific commercially available devices, Gaulin Homogenizer, Microfluidizer, DeBEE2000, and the like). The details of the method for preparing the ink jet recording ink are described in, other than the above-mentioned patent publications, respective publications of JP-A Nos. 5-148436, 5-295312, 7-97541, 7-82515, 7-118584, and 11-286637 and Japanese Patent Application No. 2000-87539, the method which is also usable for the preparation of the ink jet recording ink of the invention.

As the aqueous medium, a mixture containing water as a main component, and as desired, containing a water-miscible organic solvent added therein can be used. Examples of the water-miscible organic solvent include alcohols (e.g., methanol, ethanol, propanol, isopropanol, butanol, isobutanol, sec-butanol, t-butanol, pentanol, hexanol, cyclohexanol, and benzyl alcohol), polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerol, hexanetriol, and thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, and ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethyl propylenediamine), and other polar solvents (e.g., formamide, N,N dimethylformamide, N,N-dimethylacetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone). The water-miscible organic solvents may be used in combination of two or more kinds.

It is preferable to contain each dye of the invention in a proportion of from 0.1 part by mass to 20 parts by mass based on 100 parts by mass of the ink.

Moreover, the ink composition of the invention may contain two or more kinds of the dye in combination. In such a case, it is preferable that the oxidation potential of the dye be nobler than 0.8 V. When two or more kinds of the dye are used in combination, it is preferable that the total content of the dyes be within the above-mentioned range.

In the invention, when two or more kinds of different inks are used as inks having the same hue, it is preferable that the ink density of one ink is 0.05 to 0.5 times that of another ink.

For controlling ink properties, polyethyleneimine, polyamines, polyvinylpyrrolidone, polyethylene glycol, cellulose derivatives such as ethyl cellulose and carboxyethyl cellulose, polysaccharides and derivative thereof, other water-soluble polymers, polymer emulsions, cyclodextrin, macrocyclic amines, dendrimers, crown ethers, urea and derivatives thereof, acetamide, etc., may be used.

Examples of the chelating agent include ethylene diamine tetraacetic acid (EDTA), iminodiacetic acid (IDA), ethylene diamine-di(o-hydroxyphenyl acetic acid) (EDDHA), nitrilotriacetic acid (NTA), dihydroxyethyl glycine (DHEG), trans-1,2-cyclohexanediaminetetraacetic acid (CyDTA), diethylenetriamine-N,N,N',N',N'-pentaacetic acid (DTPA), and glycol ether diamine-N,N,N',N',-tetraacetic acid (GEDTA).

Examples of a viscosity controlling agent include methylcellulose, ethyl cellulose and derivatives thereof, glycerols, polyglycerin and a polyethylene oxide adduct thereof and a polypropylene oxide adduct thereof, and polysaccharides and derivatives thereof. Specific examples thereof include glucose, fructose, mannite, D-sorbit, dextran, xanthan gum, curdlan, cycloamylose, maltitol, and derivatives thereof.

In order to prevent blur between cyan ink, magenta ink or yellow ink and black ink in an ink set of the invention described later, a pH buffering agent may be added to the inks. Any pH buffering agent may be used insofar as the pH of ink can be stably maintained at 7.0 to 9.5. When the pH of ink is lower than 7.0, blur between colors and uneven coloring are likely to occur, resulting in deteriorated image fixability. When the pH of ink exceeds 9.5, a head member may be damaged. Preferable examples of a pH buffering agent include potassium dihydrogenphosphate/sodium hydroxide, sodium tetraborate/hydrochloric acid, potassium dihydrogenphosphate/disodium hydrogenphosphate, ammonium chloride/ammonia, trisaminomethane/hydrochloric acid, and combinations of ACES, ADA, BES, Bicine, Bis-Tris, CHES, DISPO, EPPS, HEPES, HEPPSO, MES, MOPS, MOPSO, POPSO, TAPS, TAPSO, TES, and Tricine, which are good buffers, and sodium hydroxide, potassium hydroxide, and ammonia. Among the above, a pH buffering agent containing sodium hydroxide, potassium hydroxide, and ammonia as alkali is particularly preferable. Effects of these pH buffering agents are remarkably demonstrated when the amount of ink drops is from 1 to 20 pl, and preferably 2 to 18 pl. The effects are favorably demonstrated in a thermal ink jet system.

The surface tension of the ink composition of the invention and other ink compositions mentioned later is from 20 to 70 mN/m, and preferably from 25 to 60 mN/m, at 20° C. When the surface tension is lower than 20 mN/m, blur on paper becomes remarkable, and stable discharge is hard to achieve. Thus, such surface tension is not preferable. When the surface tension is larger than 70 mN/m, ink does not sufficiently penetrate into paper, which deteriorates color development properties of secondary colors, such as blue, red, and green. Thus, such surface tension is not preferable. It is more effective that the surface tension of black ink at 20° C. is lower than that of cyan ink, magenta ink, and yellow ink.

The viscosities of the ink composition of the invention and other ink compositions mentioned later are common to any ink, and are preferably 30 mPa·s or lower, and more preferably from 1.5 to 20 mPa·s, at 20° C. When the viscosities of the ink composition of the invention and other ink compositions are within the above-mentioned ranges, most favorable results are obtained. When the viscosities of the ink composition of the invention and other ink compositions are lower than 1.5 mPa·s, discharging stability is hard to achieve. When the viscosities of the ink composition of the invention and other ink compositions are higher than 20 mPa·s, clogging is likely to occur. Thus, such viscosities are not preferable.

<Ink Set>

An ink set of the invention contains a plurality of ink compositions containing the ink composition of the invention.

It is preferable that the plurality of ink compositions contain the ink composition of the invention and at least one kind of ink composition different in hue from the ink composition of the invention (hereinafter referred to as other ink compositions).

(Other Ink Compositions)

When the ink composition of the invention is yellow, examples of other ink compositions as at least one kind of ink composition different in hue from the ink composition of the invention include ink compositions, such as magenta, cyan, and black. Other ink compositions having another hue may be further contained, as required.

The constituents of other ink compositions mentioned above are not limited except that at least a dye of each hue is contained. It is preferable that alkylurea is contained. Alkylurea to be contained in other ink compositions is the same as alkylurea used for the ink compositions of the invention mentioned above, and preferable examples are also the same.

As a preferable aspect, other ink compositions mentioned above are produced by replacing a dye of the ink composition of the invention by a dye for use in other ink compositions.

As a preferable aspect, the ink set of the invention contains ink compositions of yellow, magenta, cyan, and black among the above.

There is no limitation on a magenta dye to be contained in a magenta ink to be used in the ink set of the invention. However, the dye represented by Formula (M-1) is preferable.

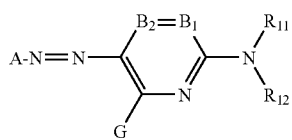

Formula (M-1)

In Formula (M-1), A represents a residue of 5-membered heterocyclic diazo component $A-NH_2$. $B_1$ and $B_2$ each independently represent $-CR_{13}=$ and $-CR_{14}=$ or either one of them represents a nitrogen atom and the other one represents $-CR_{13}=$ or $-CR_{14}=$. $R_{11}$ and $R_{12}$ each independently represent a hydrogen atom, an alkyl group, a cycloalkyl group, an alkenyl group, an alkynyl group, an aralkyl group, an aryl group, a heterocyclic group, an acyl group, an alkoxycarbonyl group, an aryloxycarbonyl group, a carbamoyl group, an alkylsulfonyl group, an arylsulfonyl group, or a sulfamoyl group. Each group may further have a substituent. G, $R_{13}$, and $R_{14}$ each independently represent a hydrogen atom, a halogen atom, an alkyl group, an alkenyl group, an alkynyl group, an aralkyl group, an aryl group, a heterocyclic group, a cyano group, a carboxyl group, a carbamoyl group, an alkoxycarbonyl group, an aryloxy carbonyl group, an acyl group, a hydroxyl group, an alkoxy group, an aryloxy group, a silyloxy group, an acyloxy group, a carbamoyloxy group, a heterocyclic oxy group, an alkoxycarbonyloxy group, an aryloxycarbonyloxy group, an amino group substituted with an alkyl group, an aryl group, or a heterocyclic group, an acylamino group, an ureido group, a sulfamoylamino group, an alkoxycarbonylamino group, an aryloxycarbonylamine group, an alkyl- and aryl-sulfonyl amino group, a nitro group, an alkyl- and arylthio group, an alkyl- and aryl-sulfonyl group, an alkyl- and aryl sulfinyl group, a sulfamoyl group, a heterocyclic thio group, or an ionic hydrophilic group. Each group may be further substituted. $R_{13}$ and $R_{11}$ or $R_{11}$ and $R_{12}$ may be bonded to each other to form a 5- to 6-membered ring. Formula (M-1) contains at least one ionic hydrophilic group.

It is more preferable that the magenta dye represented by Formula (M-1) is a magenta dye having an oxidation potential nobler than 1.0 V (vs SCE). Preferable examples of the dye represented by Formula (M-1) include compounds described in JP-A No, 2007-138124, [0489] to [0563].

A cyan dye contained in cyan ink to be used in the ink set of the invention is preferably the dye represented by Formula (C-1).

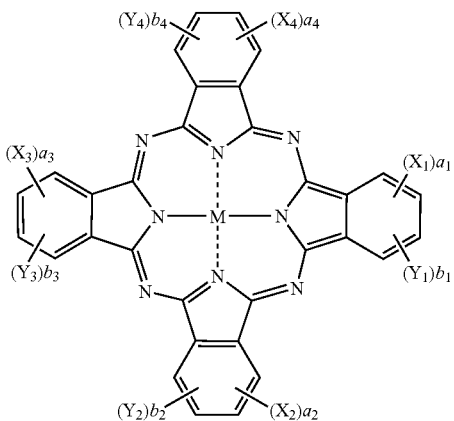

Formula (C-1)

In Formula (C-1), $X_1$, $X_2$, $X_3$, and $X_4$ each independently represent $-SO-Z$, $-SO_2-Z$, $-SO_2NV_1V_2$, $-CONV_1V_2$, $-CO_2Z$, $-CO-Z$, or a sulfo group. Here, Z each independently represent a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group. $V_1$ and $V_2$ may be the same or different from each other, and represent a hydrogen atom, a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group. $Y_1$, $Y_2$, $Y_3$, and $Y_4$ each independently represent a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, an ureido group, a sulfamoylamino group, an alkylthio group, an arylthio group, an alkoxycarbonylamino group, a sulfonamide group, a carbamoyl group, a sulfamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group, an acyl group, or an ionic hydrophilic group. Each group may further have a substituent. $a_1$ to $a_4$ and $b_1$ to $b_4$ each represent the number of substituents of $X_1$ to $X_4$ and $Y_1$ to $Y_4$. $a_1$ to $a_4$ each independently represent an integer of 0 to 4, and all of $a_1$ to $a_4$ are not simultaneously 0. $b_1$ to $b_4$ each independently represent an integer of 0 to 4. M represents a hydrogen atom, a metal atom or oxides thereof, a hydroxide, or a halide. At least one of $X_1$, $X_2$, $X_3$, $X_4$, $Y_1$, $Y_2$, $Y_3$, or $Y_4$ is an ionic hydrophilic group or a group having an ionic hydrophilic group as a substituent).

It is more preferable that the cyan dye represented by Formula (C-1) be a cyan dye having an oxidation potential nobler than 1.0 V (vs SCE). Preferable specific examples of a cyan dye include compounds described in JP-A No. 2007-138124, [0582] to [0652].

A black dye to be contained in a black ink to be used in the ink set of the invention is preferably a dye represented by Formula (B-1).

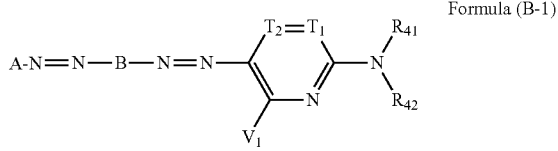

Formula (B-1)

In Formula (B-1), A and B each independently represent an aromatic group which may be substituted or a heterocyclic group which may be substituted (A represents a monovalent group and B represents a divalent group).

$T_1$ and $T_2$ each represent $=CR_{43}-$ and $-CR_{44}=$, or either one of them represents a nitrogen atom and the other one represents $=CR_{43}-$ or $-CR_{44}=$. $V_1$, $R_{43}$, and $R_{44}$ each independently represent a hydrogen atom, a halogen atom, an alkyl group, an alkenyl group, an alkynyl group, an aralkyl group, an aryl group, a heterocyclic group, a cyano group, a carboxyl group, a carbamoyl group, an alkoxycarbonyl group, an aryloxycarbonyl group, a heterocyclicoxycarbonyl group, an acyl group, a hydroxyl group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (including an alkylamino group, an arylamino group, and a heterocyclic amino group), an acylamino group, an ureido group, a sulfamoylamino group, an alkoxycarbonylamino group, an aryloxycarbonylamine group, an alkyl- or aryl-sulfonylamino group, a heterocyclic sulfonylamino group, a nitro group, an alkyl- and arylthio group, a heterocyclic thio group, an alkyl- and aryl-sulfonyl group, a heterocyclic sulfonyl group, an alkyl- and aryl-sulfinyl group, a heterocyclic sulfinyl group, a sulfamoyl group, or a sulfo group. Each group may be further substituted. $R_{41}$ and $R_{42}$ each independently represent a hydrogen atom, an alkyl group, an alkenyl group, an alkynyl group, an aralkyl group, an aryl group, a heterocyclic group, an acyl group, an alkoxycarbonyl group, an aryloxy carbonyl group, a carbamoyl group, an alkyl- or aryl-sulfonyl group, and a sulfamoyl group. Each group may further have a substituent. $R_{41}$ and $R_{42}$ are not simultaneously hydrogen atoms. $R_{43}$ and $R_{41}$ or $R_{41}$ and $R_{42}$ may be bonded to each other to form a 5- to 6-membered ring.

The black dye represented by Formula (B-1) is more preferably a black dye having an oxidation potential nobler than 1.0 V (vs SCE). Preferable specific examples of a black dye include compounds described in JP-A No. 2007-138124, [0669] to [0772].

In the yellow dye, magenta dye, cyan dye, and black dye, other dyes may be used in combination for the purpose of adjusting a hue, controlling a fading rate, etc. Specific examples of a dye which is suitable for combination use include compounds described in JP-A No. 2007-138124.

[Image Recording Method]

The image recording method of the invention (hereinafter also referred to as an "ink jet recording method") is a method of printing an image at a printing rate of 360 or more sheets per hour using the ink composition of the invention or the ink set of the invention to record the image.

By printing an image at a high speed, i.e., at a printing rate of 360 or more sheets per hour, using the ink composition of the invention or the ink set of the invention, high efficient printing record capable of suppressing changes in hue after recording and reducing density differences between a part where a printed image to be overlaid is overlaid and a part where the printed image is not overlaid may be carried out.

The image recording method of the invention shows more outstanding effects as the printing rate is higher. In particular, outstanding effects are demonstrated at a printing rate of 360 or more sheets per hour. A printing rate of 480 or more sheets per hour is more preferable. A printing rate of 600 sheets per hour is more preferable. When the printing rate is adjusted to 480 or more sheets per hour, the effects of the invention are more remarkably exhibited. Thus, such a printing rate is preferable.

The ink jet recording method of the invention involves supplying energy to the ink composition or the ink composition of the ink set of the invention (hereinafter also merely referred to as an ink composition) to form an image on known image receiving materials, i.e., regular paper and resin-coated paper, such as ink jet-specific paper, film, electrophotographic common paper, cloth, glass, metal, or ceramic, descried in JP-A Nos. 8-169172, 8-27693, 2-276670, 7-276789, 9-323475, 62-238783, 10-153989, 10-217473, 10-235995, 10-337947, 10-217597, and 10-337947.

In forming an image, a polymer latex compound may be used in combination for the purpose of imparting glossiness or water resistance, or improving weatherability. The timing of giving the polymer latex to the image receiving material may be before or after giving a colorant or simultaneously therewith. Accordingly, the receiving site may be in the image receiving paper or in the ink. Alternatively, the polymer latex may be used in the form of a liquid material of the polymer latex alone. Specifically, methods described in Japanese Patent Application Nos. 2000-363090, 2000-315231, 2000-354380, 2000-343944, and 2000-268952 may be preferably used.

The recording paper and recording film which are used for ink jet printing using the ink composition of the invention will be described below. As a support in the recording paper or recording film, those made of a chemical pulp, such as LBKP or NBKP; a mechanical pulp, such as GP, PGW, RMP, TMP, CTMP, CMP, or CGP; or a waste paper pulp such as DIP, to which known additives, such as pigments, binders, sizing agents, fixing agents, cationic agents, and paper strength additives, are added, as required, and produced by various devices such as a fourdrinier paper machine and a cylinder paper machine may be employed. Besides these supports, synthetic papers and plastic film sheets may also be employed. The support preferably has a thickness of from 10 to 250 μm and a basis weight of from 10 to 250 g/m². The support may be provided directly with an ink receiving layer or a backcoat layer, or may be provided with an ink receiving layer or a backcoat layer after size pressing with starch, polyvinyl alcohol, etc., or providing an anchor coat layer. Further, the support may be flattened by a calendering device, such as a machine calender, a TG calender, or a soft calender. In the invention, paper or plastic film, the both surfaces of which are laminated with polyolefin (such as polyethylene, polystyrene, polyethylene terephthalate, polybutene, and copolymers thereof), are more preferably used as the support. It is preferable to add a white pigment (e.g., titanium white and zinc oxide) or a toning dye (e.g., cobalt blue, ultramarine, and neodymium oxide) to polyolefin.

In the ink receiving layer to be provided on the support, a pigment and an aqueous binder are contained. As the pigment, white pigments are preferable, and examples thereof include white inorganic pigments, such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide, and zinc carbonate; and organic pigments, such as styrene based pigments, acrylic pigments, urea resins, and melamine resins. As the white pigment to be contained in the ink receiving layer, porous inorganic pigments are preferable, and synthetic amorphous silica having a large pore area is particularly preferable. With respect to the synthetic amorphous silica, any of anhydrous silicate obtained by a dry production process and hydrated silicate obtained by a wet production process may be employed. The use of hydrated silicate is particularly preferable.

Examples of the aqueous binder to be contained in the ink receiving layer include water-soluble high-molecular compounds, such as polyvinyl alcohol, silanol-modified polyvinyl alcohol, starch, cationic starch, casein, gelatin, carboxymethylcellulose, hydroxyethylcellulose, polyvinylpyrrolidone, polyalkylene oxides, and polyalkylene oxide derivatives; and water-dispersible high-molecular compounds, such as a styrene-butadiene latex and acrylic emulsions. The aqueous binder can be used singly or in combination of two or more kinds. In the invention, among the above, polyvinyl alcohol and silanol-modified polyvinyl alcohol are particularly preferable from the viewpoint of adhesion to pigments and resistance to peeling of the ink receiving layer.

The ink receiving layer may contain a mordant, a waterproofing agent, a light fastness improver, a surfactant, and other additives in addition to the pigment and aqueous binder.

It is preferable that the mordant to be added in the ink receiving layer be immobilized. For achieving this purpose, a polymer mordant is preferably used.

The polymer mordant is described in JP-A Nos. 48-28325, 54-74430, 54-124726, 55-22766, 55-142339, 60-23850, 60-23851, 60-23852, 60-23853, 60-57836, 60-60643, 60-118834, 60-122940, 60-122941, 60-122942, 60-235134, and 1-161236, and U.S. Pat. Nos. 2,484,430, 2,548,564, 3,148,061, 3,309,690, 4,115,124, 4,124,386, 4,193,800, 4,273,853, 4,282,305, and 4,450,224. Image receiving materials containing a polymer mordant described in JP-A No. 1-161236, pp. 212 to 215 are particularly preferable. When the polymer mordant described in the patent publication is used, images having excellent image quality are obtained, and the resistance to light of an image is improved.

The waterproofing agent is effective for waterproofing an image, and as the waterproofing agent, cationic resins are preferable. Examples of cationic resins include polyamidepolyamine epichlorohydrin, polyethyleneimine, polyaminesulfone, a dimethyldiallyammonium chloride polymer, cationic polyacrylamide, and colloidal silica. Among these cationic resins, polyamidepolyamine epichlorohydrin is particularly preferable. The content of the cationic resin is preferably from 1 to 15% by weight, and particularly preferably from 3 to 10% by weight based on the total solid content of the ink receiving layer.

Examples of the light fastness improver include zinc sulfate, zinc oxide, hindered amine based antioxidants, and benzophenone- or benzotriazole-based ultraviolet absorbers. Among the above, zinc sulfate is particularly preferable.

The surfactant functions as a coating aid, a release improver, a slipperiness improver, or an antistatic agent. The surfactant is described in JP-A Nos. 62-173463 and 62-183457. An organic fluoro compound may be used in place of the surfactant. It is preferable that the organic fluoro compound be hydrophobic. Examples of the organic fluoro compound include fluorine based surfactants, oily fluorine based compounds (e.g., fluoro oils), and solid-state fluoro compound resins (e.g., tetrafluoroethylene resins). The organic fluoro compounds are described in JP-B No. 57-9053 (columns 8 to 17), and JP-A Nos. 61-2099 and 62-135826. Examples of other additives to be added to the ink receiving layer include pigment dispersants, thickeners, antifoaming agents, dyes, fluorescent brighteners, antiseptics, pH adjustors, matting agents, and hardeners. The ink receiving layer may be of a single-layer or double-layer structure.

The recording paper or recording film may be provided with a backcoat layer. Examples of components that may be added to the backcoat layer include white pigments, aqueous binders, and other components. Examples of white pigments that are contained in the backcoat layer include white inorganic pigments, such as light calcium carbonate, heavy calcium carbonate, kaolin, talc, calcium sulfate, barium sulfate, titanium dioxide, zinc oxide, zinc sulfide, zinc carbonate, satinwhite, aluminum silicate, diatomaceous earth, calcium silicate, magnesium silicate, synthetic amorphous silica, colloidal silica, colloidal alumina, pseudoboehmite, aluminum hydroxide, alumina, lithopone, zeolite, hydrated halloysite, magnesium carbonate, and magnesium hydroxide; and organic pigments, such as styrene based plastic pigments, acrylic plastic pigments, polyethylene, microcapsules, urea resins, and melamine resins.

Examples of aqueous binders that are contained in the backcoat layer include water-soluble high-molecular compounds, such as styrene/maleic acid salt copolymers, styrene/acrylic acid salts copolymers, polyvinyl alcohol, silanolmodified polyvinylalcohol, starch, cationic starch, casein, gelatin, carboxymethyl cellulose, hydroxyethyl cellulose, and polyvinylpyrrolidone; and water-dispersible high-molecular compounds, such as a styrene-butadiene latex and acrylic emulsions. Examples of other components that are contained in the backcoat layer include antifoaming agents, foam inhibitors, dyes, fluorescent brighteners, antiseptics, and waterproofing agents.

In the structural layers (including the backcoat layer) of the ink jet recording paper or recording film, a polymer latex may be added. The polymer latex is used for the purpose of improving film physical properties, such as dimensional stabilization, curl prevention, adhesion prevention, and cracking prevention of film. The polymer latex is described in JP-A Nos. 62-245258, 62-136648, and 62-110066. When a polymer latex having a low glass transition temperature (40° C. or lower) is added to a layer containing a mordant, it is possible to prevent cracking or curl of the layer. Even when a polymer latex having a high glass transition temperature is added to the backcoat layer, the layer may be prevented from curling.

The ink composition of the invention is not limited in the ink jet recording mode, and known modes may be employed. Examples include a charge control mode of ejecting an ink utilizing an electrostatic induction force, a drop on-demand mode utilizing a vibration pressure of piezoelectric device (pressure pulse mode), an acoustic ink jet mode of converting electric signals to acoustic beams, irradiating an ink with the beams, and ejecting the ink utilizing a radiation pressure, and a thermal ink jet mode of heating an ink to form bubbles and utilizing a generated pressure. The ink jet recording mode includes a mode of injecting a number of small volumes of an ink having a low concentration referred to as a photo ink, a mode of improving the image quality using plural inks having substantially the same hue and different densities, and a mode of using a colorless transparent ink.

Hereinafter, aspects of the invention will be exemplified.

<1> An ink composition comprising at least a dye represented by the following Formula (1), monohydric alcohol having 1 to 5 carbon atoms, and urea:

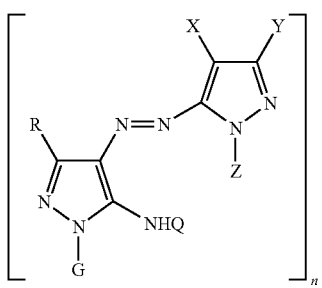

Formula (1)

wherein G represents a heterocyclic group; n represents an integer from 1 to 3; when n is 1, R, X, Y, Z, Q, and G each represent a monovalent group; when n is 2, R, X, Y, Z, Q, and G each represent a monovalent or divalent substituent, in which at least one of R, X, Y, Z, Q, or G represents a divalent substituent; and when n is 3, R, X, Y, Z, Q, and G each represent a monovalent, divalent, or trivalent substituent, in which at least two of R, X, Y, Z, Q, or G represent a divalent substituent or represent a trivalent substituent.

<2> The ink composition according to <1> above, in which the content of the monohydric alcohol in the ink composition is from 0.1% by mass to 15% by mass.

<3> The ink composition according to <1> or <2> above, in which the content of the urea in the ink composition is from 1% by mass to 15% by mass.

<4> An ink set comprising a plurality of ink compositions containing at least one of the ink compositions according to any one of <1> to <3> above.

<5> The ink set according to <4> above, in which all of the plurality of ink compositions contain monohydric alcohol having 1 to 5 carbon atoms and urea.

<6> An image recording method comprising printing an image on an image receiving material at a printing rate of 360 or more sheets per hour using the ink composition according to any one of <1> to <3> above or the ink set according to <4> or <5> above.

EXAMPLES

Hereinafter, the present invention will be specifically described with reference to Examples, but is not limited thereto. Unless otherwise specified, "part" and "%" are based on mass.

Example 1

Preparation of Ink Composition (Preparation of Ink Compositions Y-01 to 07 (Present Invention) and Y-08 to 10 (Comparative Examples))

The respective components having the compositions shown in Table 1 were dissolved by stirring for 1 hour while heating at 30 to 40° C. Thereafter, the resultant was filtered under reduced pressure with a micro filter having an average pore size of 0.20 μm to prepare each ink composition.

<Printing of Yellow Image>

The ink was charged in a Dry Minilab 400 ink cartridge manufactured by Fuji Photo Film Co., Ltd. Then, 102 mm×152 mm size print was carried out using a roll paper at a processing rate of 650 sheets per hour under the environment of 23° C./50% RH. The yellow ink was printed at an image density of 100% with Dry Minilab 400 to form a monochromatic solid image. In the process, printing was performed while stopping a printer drying unit, a photographic paper discharged next was overlaid on a substantially half part (a part) on a printed side immediately after printing, and the remaining half part (b part) was dried for 24 hours while being exposed to the environmental conditions.

Thereafter, the overlaid photographic paper was removed, and drying was further performed for 24 hours under the environmental conditions.

<Image Evaluation>

The density of each of the a part and the b part obtained above of 100% photographic paper was measured using a reflection density meter X-rite 310. The density ratio ($C_{b/a}$) of the b part to the a part was calculated.

The evaluation was performed according to the following criteria: A: $C_{b/a}$ is from 0.95 to 1.05; B: $C_{b/a}$ is lower than 0.95 and 0.90 or higher or higher than 1.05 and 1.10 or lower; C: $C_{b/a}$ is lower than 0.90, or higher than 1.10. As $C_{b/a}$ is closer to 1, the image density is uniform irrespective of a dry state after printing. Thus, such $C_{b/a}$ is preferable.

TABLE 1

| Ink composition | Y-01 (Present Invention) | Y-02 (Present Invention) | Y-03 (Present Invention) | Y-04 (Present Invention) | Y-05 (Present Invention) | Y-06 (Present Invention) | Y-07 (Present Invention) | Y-08 (Comparative Example) | Y-09 (Comparative Example) | Y-10 (Comparative Example) |
|---|---|---|---|---|---|---|---|---|---|---|
| Dye Y-1 | 25 g | 25 g | 25 g | 25 g | 25 g | 25 g | 25 g | 25 g | 25 g | |
| Direct yellow 132 | | | | | | | | | | 25 g |
| Diethylene glycol | 90 g | 90 g | 90 g | 90 g | 90 g | 90 g | 90 g | 90 g | 90 g | 90 g |
| 2-pyrrolidone | 50 g | 50 g | 50 g | 50 g | 50 g | 50 g | 50 g | 50 g | 50 g | 50 g |
| Glycerol | 90 g | 90 g | 90 g | 90 g | 90 g | 90 g | 90 g | 90 g | 90 g | 90 g |
| 2-propanol | 50 g | 50 g | 10 g | 10 g | 5 g | 50 g | | 50 g | | 50 g |
| Ethanol | | | | | | | 50 g | | | |
| Urea | 100 g | 50 g | 100 g | 50 g | 100 g | 20 g | 100 g | | 100 g | 100 g |
| Triethanol-amine | 3 g | 3 g | 3 g | 3 g | 3 g | 3 g | 3 g | 3 g | 3 g | 3 g |
| Proxel XL2 | 0.1 g | 0.1 g | 0.1 g | 0.1 g | 0.1 g | 0.1 g | 0.1 g | 0.1 g | 0.1 g | 0.1 g |
| Benzotriazole | 0.2 g | 0.2 g | 0.2 g | 0.2 g | 0.2 g | 0.2 g | 0.2 g | 0.2 g | 0.2 g | 0.2 g |
| Olfine E1010 | 10 g | 10 g | 10 g | 10 g | 10 g | 10 g | 10 g | 10 g | 10 g | 10 g |
| | Adding ultra pure water to a final volume of 1,000 g | | | | | | | | | |
| Evaluation result | A | A | A | A | B | B | A | C | C | C |

The dye Y-1 of Table 1 is shown below.

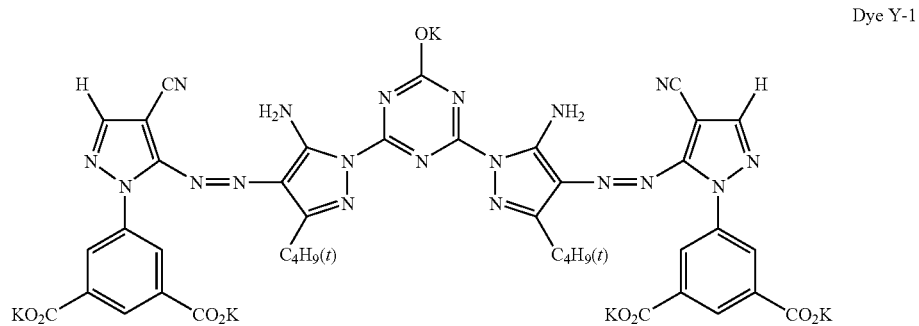

Dye Y-1

The results of Table 1 has revealed that even when an image receiving material on which an image was formed at a high rate was overlaid, the ink composition of the invention reduces density differences between a part where the image receiving material was overlaid and a part where the image receiving material was not overlaid.

Example 2

Production of Ink Set (Preparation of Ink Compositions M-01, C-01, Bk-01, Y-11, M-11, C-11, and Bk-11)

The respective components having the compositions shown in Table 2 were dissolved by stirring for 1 hour while heating at 30 to 40° C. Thereafter, the resultant was filtered under reduced pressure with a micro filter having an average pore size of 0.20 μm to prepare each ink composition.

(Production of Ink Sets 1, 2)

An ink set 1 was produced using the ink composition Y-1 obtained in Example 1 and the ink compositions M-01 (magenta ink), C-01 (cyan ink), and Bk-01 (black ink) obtained above.

An ink set 2 was produced using the ink compositions Y-11, M-11, C-11, and Bk-11 obtained above in the same manner as above.

<Printing of Gray Image>

The ink set obtained above was charged in a Dry Minilab 400 ink cartridge manufactured by Fuji Photo Film Co., Ltd. Then, 102 mm×152 mm size print was carried out using a roll paper at a processing rate of 650 sheets per hour under the environment of 23° C./50% RH.

The yellow ink, magenta ink, cyan ink, and black ink were printed at an image density of 100% in total with Dry Minilab 400 to form a gray solid image. In the process, printing was performed while stopping a printer drying unit, a photographic paper discharged next was overlaid on a substantially half part (a part) on a printed side immediately after printing, and the remaining half part (b part) was dried for 24 hours while being exposed to the environmental conditions.

Thereafter, the overlaid photographic paper was removed, and drying was further performed for 24 hours under the environmental conditions.

Image Evaluation

The image was evaluated in the same manner as in Example 1 using the photographic paper, on which the gray solid image was formed, obtained above.

TABLE 2

| Ink composition | M-01 (Present Invention) | C-01 (Present Invention) | BK-01 (Present Invention) | Y-11 (Comparative Example) | M-11 (Comparative Example) | C-11 (Comparative Example) | BK-11 (Comparative Example) |
|---|---|---|---|---|---|---|---|
| Dye Y-1 | | | | 25 g | | | |
| Dye M-1 | 35 g | | | | 35 g | | |
| Dye C-1 | | 60 g | | | | 60 g | |
| Dye Bk-1 | | | 60 g | | | | 60 g |
| Dye Bk-2 | | | 15 g | | | | 15 g |
| Ethylene glycol | | 90 g | | | | 90 g | |
| Diethylene glycol | 90 g | | 90 g | 90 g | 90 g | | 90 g |
| 2-pyrrolidone | 30 g | 50 g | 50 g | 50 g | 30 g | 50 g | 50 g |
| Glycerol | 90 g | 80 g | 90 g | 90 g | 90 g | 80 g | 90 g |
| 2-propanol | 50 g | 50 g | 50 g | 0 g | 0 g | 0 g | 0 g |
| Urea | 100 g | 100 g | 100 g | 0 g | 0 g | 0 g | 0 g |
| Triethanolamine | 3 g | 3 g | 3 g | 3 g | 3 g | 3 g | 3 g |
| Proxel XL2 | 0.1 g | 0.1 g | 0.1 g | 0.1 g | 0.1 g | 0.1 g | 0.1 g |
| Benzotriazole | 0.2 g | 0.2 g | 0.2 g | 0.2 g | 0.2 g | 0.2 g | 0.2 g |
| Olfine E1010 | 40 g | 40 g | 10 g | 10 g | 40 g | 40 g | 10 g |
| Adding ultra pure water to a final volume of 1,000 g | | | | | | | |

The ink set 1 containing the Y-01, M-01, C-01, and Bk-01 inks of the invention was evaluated as A. In contrast thereto, the ink set 2 containing the Y-11, M-11, C-11, and Bk-11 inks of Comparative Examples was evaluated as C.

The magenta dye, cyan dye, and black dye used above will be shown below.

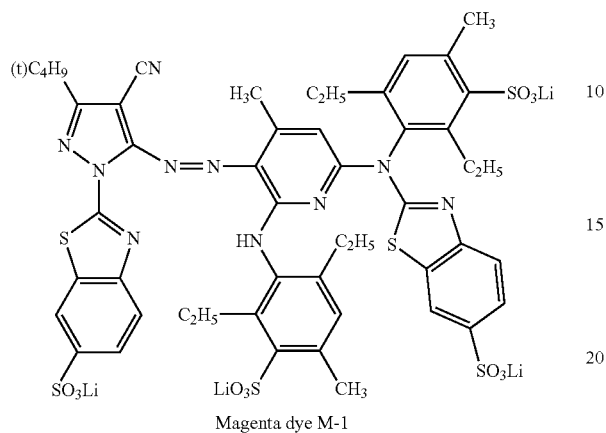

Magenta dye M-1

Cyan Dye C-1

One of rings A to D:

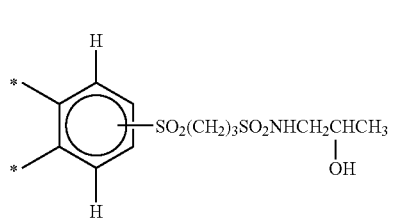

Remaining three:

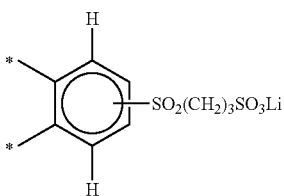

* represents a bonding position to a hthalocyanine ring.

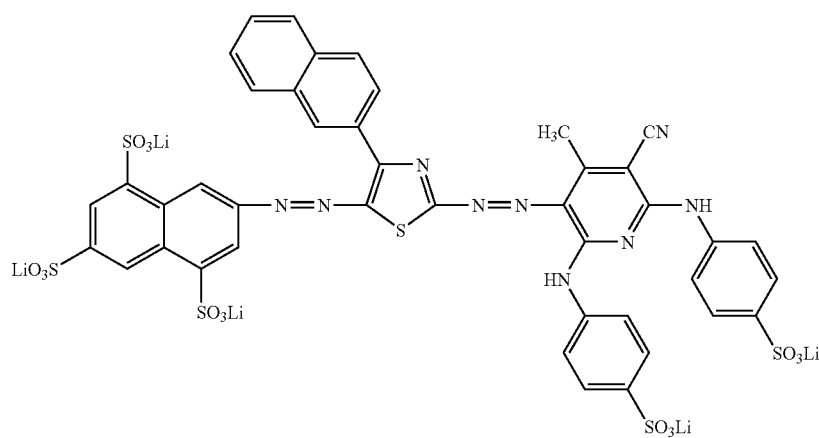

Black dye Bk-1

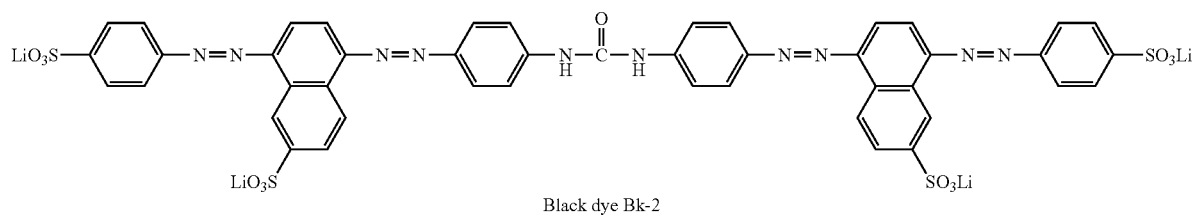

Black dye Bk-2

In a recording method using conventional ink jet dyes, changes in printing density and hue after ink jet recording pose problems.

The cause of the changes in printing density and hue has not yet been elucidated. In the case where the image receiving material is immediately overlaid after recording, the changes are observed in a part where the image receiving material has been overlaid and a part where the image receiving material has not been overlaid. In particular, the differences are notable in the case of image formation at a high rate.

In view of the circumstance, an ink composition in which changes in hue after recording are small and density differences between a part where the image receiving material has been overlaid and a part where the image receiving material has not been overlaid are small has been desired.

The present invention has been made in view of the above, and aims to provide an ink composition in which, even when an image receiving material on which an image has been formed at a high rate is overlaid, density differences between a part where the image receiving material has been overlaid and a part where the image receiving material has not been overlaid are reduced, an ink set, and an image recording method using the same.

The present invention can provide an ink an ink composition in which, even when an image receiving material on which an image has been formed at a high rate is overlaid, density differences between a part where the image receiving material has been overlaid and a part where the image receiving material has not been overlaid are reduced, an ink set, and an image recording method using the same.

What is claimed is:

1. An ink composition comprising at least a dye represented by the following Formulas (Y-2), (Y-3), (Y-4) or (Y-5), monohydric alcohol having 1 to 5 carbon atoms, and urea:

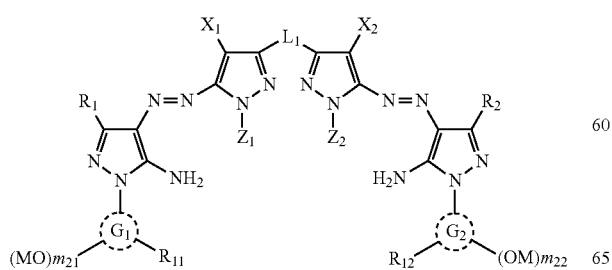

Formula (Y-2)

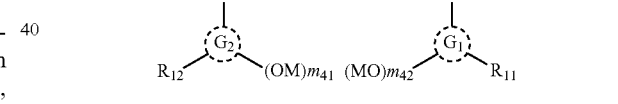

Formula (Y-3)

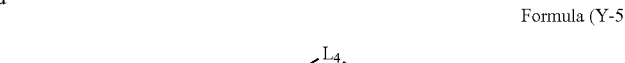

Formula (Y-4)

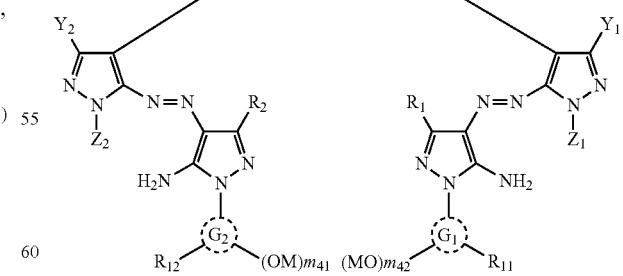

Formula (Y-5)

wherein, in Formulas (Y-2), (Y-3), (Y-4), and (Y-5):

$R_1$, $R_2$, $R_{11}$, $R_{12}$, $X_1$, $X_2$, $Y_1$, $Y_2$, $Z_1$, and $Z_2$ each independently represent a monovalent group;

$L_1$, $L_2$, $L_3$, and $L_4$ each represent a divalent linking group;

G₁ and G₂ each independently represent an atomic group forming a 5- to 8-membered nitrogen-containing heterocyclic ring;

$m_{21}$, $m_{22}$, $m_{31}$, $m_{32}$, $m_{41}$, $m_{42}$, $m_{51}$, and $m_{52}$ each independently represent an integer from 0 to 3; and M represents a hydrogen atom or cation.

2. The ink composition according to claim 1, wherein the content of the monohydric alcohol in the ink composition is from 0.1% by mass to 15% by mass.

3. The ink composition according to claim 1, wherein the content of the urea in the ink composition is from 1% by mass to 15% by mass.

4. An ink set comprising a plurality of ink compositions containing at least one ink composition, wherein the at least one ink set composition comprises at least a dye represented by the following Formulas (Y-2), (Y-3), (Y-4) or (Y-5), monohydric alcohol having 1 to 5 carbon atoms, and urea:

Formula (Y-2)

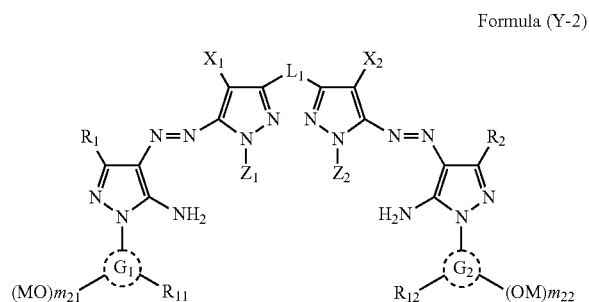

Formula (Y-3)

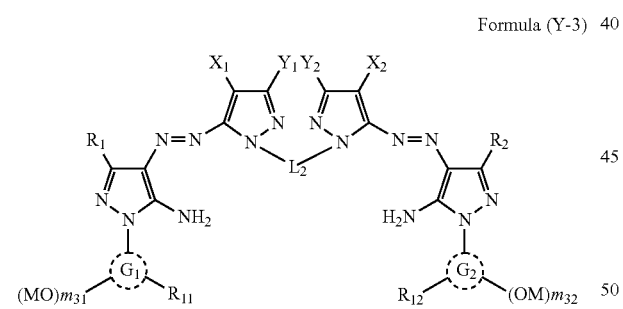

Formula (Y-4)

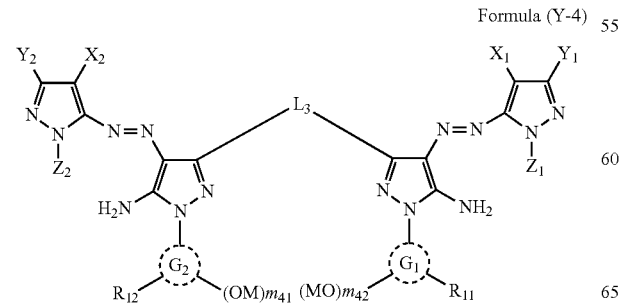

Formula (Y-5)

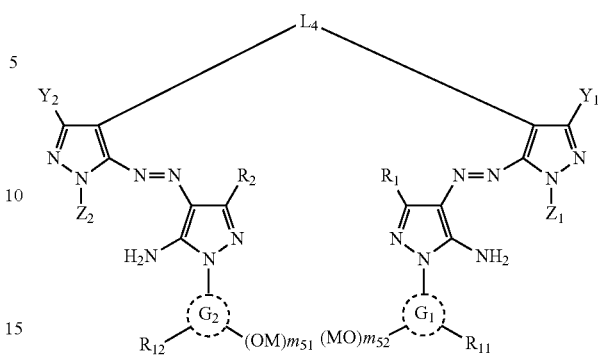

wherein, in Formulas (Y-2), (Y-3), (Y-4), and (Y-5):

$R_1$, $R_2$, $R_{11}$, $R_{12}$, $X_1$, $X_2$, $Y_1$, $Y_2$, $Z_1$, and $Z_2$ each independently represent a monovalent group;

$L_1$, $L_2$, $L_3$, and $L_4$ each represent a divalent linking group;

G₁ and G₂ each independently represent an atomic group forming a 5- to 8-membered nitrogen-containing heterocyclic ring;

$m_{21}$, $m_{22}$, $m_{31}$, $m_{32}$, $m_{41}$, $m_{42}$, $m_{51}$, and $m_{52}$ each independently represent an integer from 0 to 3; and M represents a hydrogen atom or cation.

5. The ink set according to claim 4, wherein all of the plurality of ink compositions comprise monohydric alcohol having 1 to 5 carbon atoms and urea.

6. An image recording method comprising printing an image on an image receiving material at a printing rate of 360 or more sheets per hour utilizing an ink composition, wherein the ink composition comprises at least a dye represented by the following Formulas (Y-2), (Y-3), (Y-4) or (Y-5), monohydric alcohol having 1 to 5 carbon atoms, and urea:

Formula (Y-2)

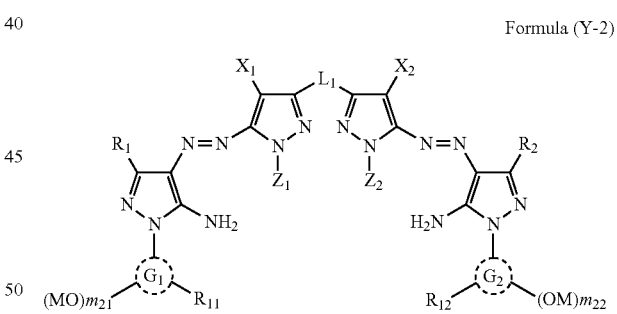

Formula (Y-3)

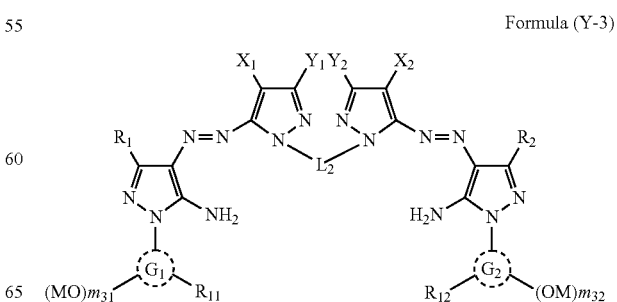

Formula (Y-4)

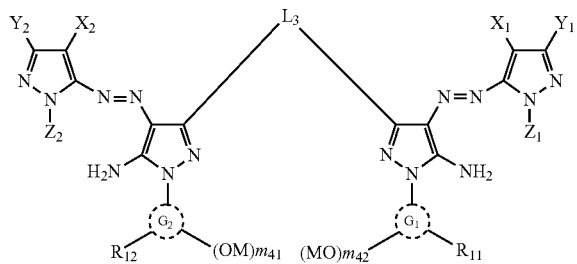

Formula (Y-5)

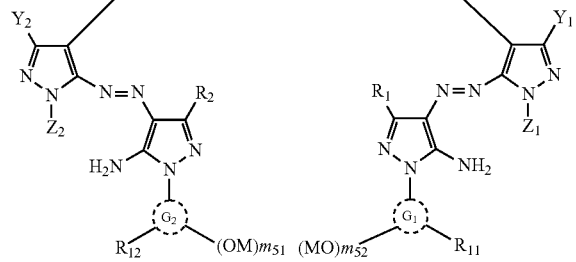

wherein, in Formulas (Y-2), (Y-3), (Y-4), and (Y-5):

$R_1$, $R_2$, $R_{11}$, $R_{12}$, $X_1$, $X_2$, $Y_1$, $Y_2$, $Z_1$, and $Z_2$ each independently represent a monovalent group;

$L_1$, $L_2$, $L_3$, and $L_4$ each represent a divalent linking group;

$G_1$ and $G_2$ each independently represent an atomic group forming a 5- to 8-membered nitrogen-containing heterocyclic ring;

$m_{21}$, $m_{22}$, $m_{31}$, $m_{32}$, $m_{41}$, $m_{42}$, $m_{51}$, and $m_{52}$ each independently represent an integer from 0 to 3; and M represents a hydrogen atom or cation.

7. An image recording method comprising printing an image on an image receiving material at a printing rate of 360 or more sheets per hour utilizing an ink set, wherein the ink set comprises a plurality of ink compositions containing at least one ink composition, wherein the at least one ink set composition comprises at least a dye represented by the following Formulas (Y-2), (Y-3), (Y-4) or (Y-5), monohydric alcohol having 1 to 5 carbon atoms, and urea:

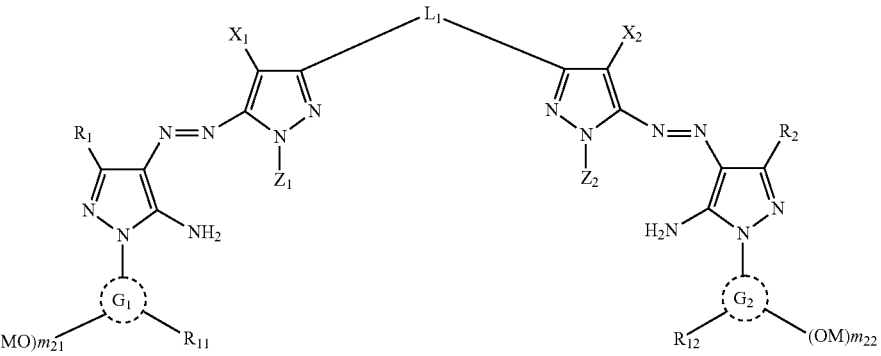

Formula (Y-3)

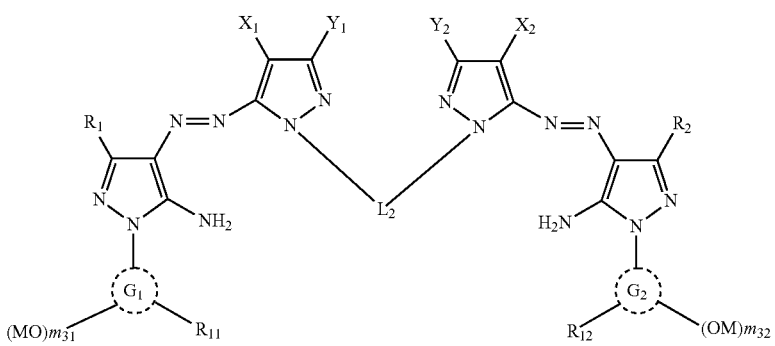

Formula (Y-4)

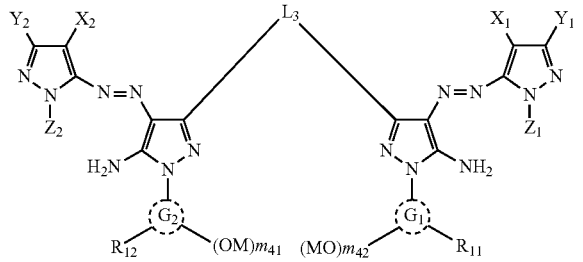

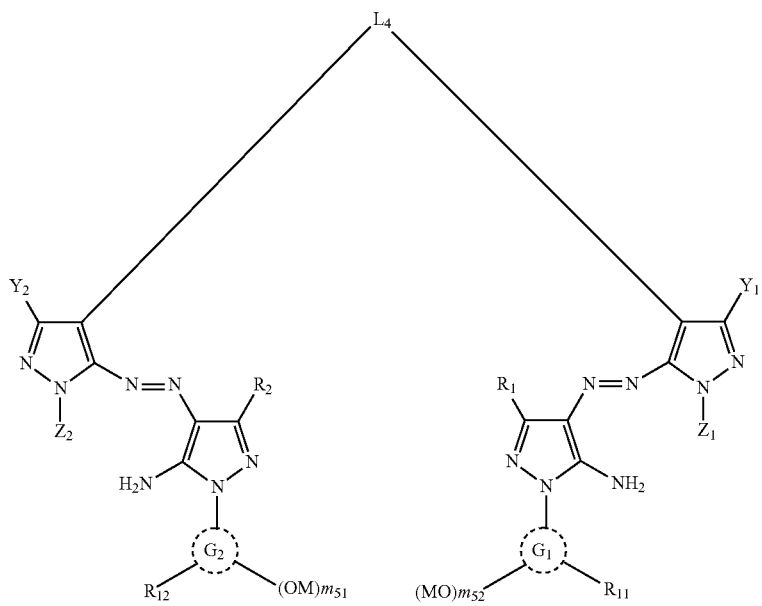

wherein, in Formulas (Y-2), (Y-3), (Y-4), and (Y-5):

$R_1$, $R_2$, $R_{11}$, $R_{12}$, $X_1$, $X_2$, $Y_1$, $Y_2$, $Z_1$, and $Z_2$ each independently represent a monovalent group, $L_1$, $L_2$, $L_3$, and $L_4$ each represent a divalent linking group;

$G_1$ and $G_2$ each independently represent an atomic group forming a 5- to 8-membered nitrogen-containing heterocyclic ring;

$m_{21}$, $m_{22}$, $m_{31}$, $m_{32}$, $m_{41}$, $m_{42}$, $m_{51}$, and $m_{52}$ each independently represent an integer from 0 to 3; and M represents a hydrogen atom or cation.

8. An image recording method comprising printing an image on an image receiving material at a printing rate of 360 or more sheets per hour utilizing an ink set, wherein the ink set comprises a plurality of ink compositions containing at least one ink composition, wherein the at least one ink set composition comprises at least a dye represented by the following Formulas (Y-2), (Y-3), (Y-4) or (Y-5), monohydric alcohol having 1 to 5 carbon atoms, and urea:

Formula (Y-5)

Formula (Y-2)

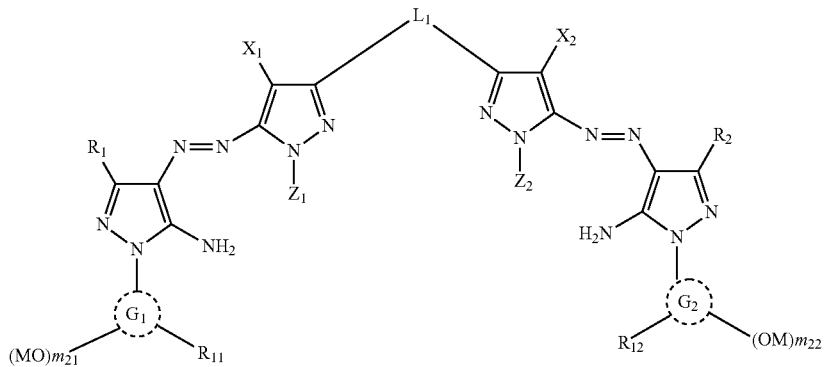

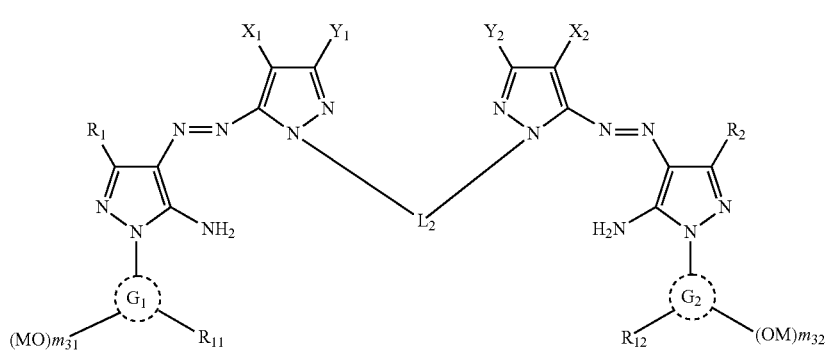

Formula (Y-3)

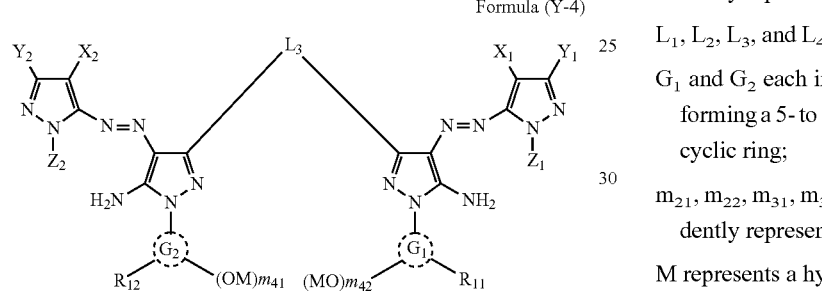

Formula (Y-4)

wherein, in Formulas (Y-2), (Y-3), (Y-4), and (Y-5):

$R_1, R_2, R_{11}, R_{12}, X_1, X_2, Y_1, Y_2, Z_1$, and $Z_2$ each independently represent a monovalent group;

$L_1, L_2, L_3$, and $L_4$ each represent a divalent linking group;

$G_1$ and $G_2$ each independently represent an atomic group forming a 5- to 8-membered nitrogen-containing heterocyclic ring;

$m_{21}, m_{22}, m_{31}, m_{32}, m_{41}, m_{42}, m_{51}$, and $m_{52}$ each independently represent an integer from 0 to 3; and M represents a hydrogen atom or cation.

9. The ink composition according to claim 1, wherein the dye is selected from the group consisting of Formulas Y-051, Y-052, Y-053, and Y-054:

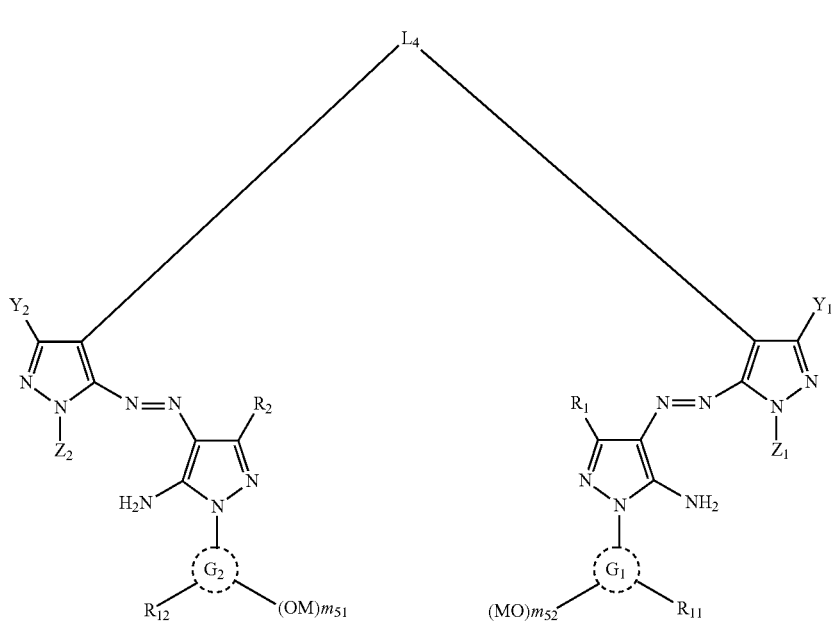

Formula (Y-5)

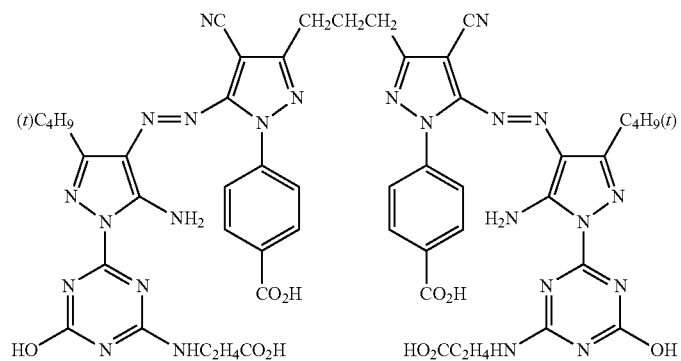
Formula Y-051
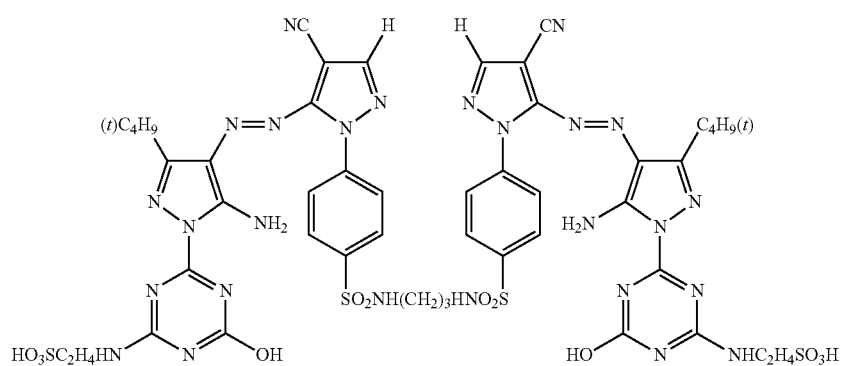
Formula Y-052
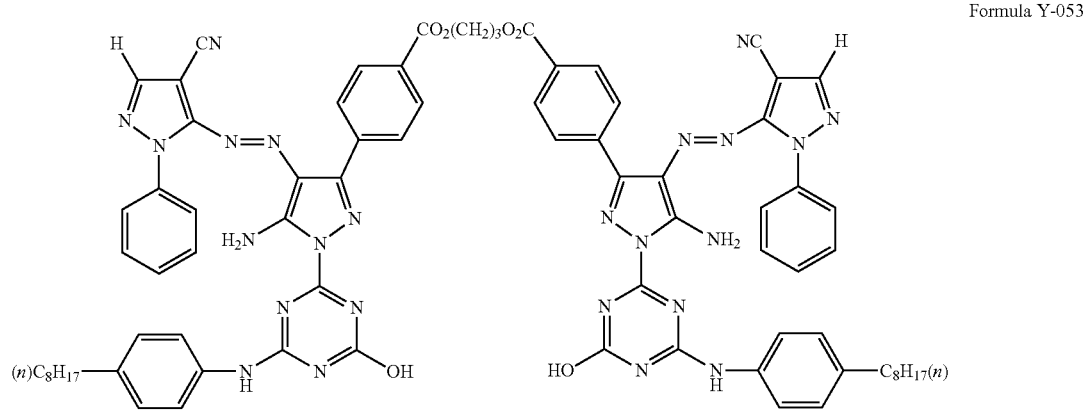
Formula Y-053
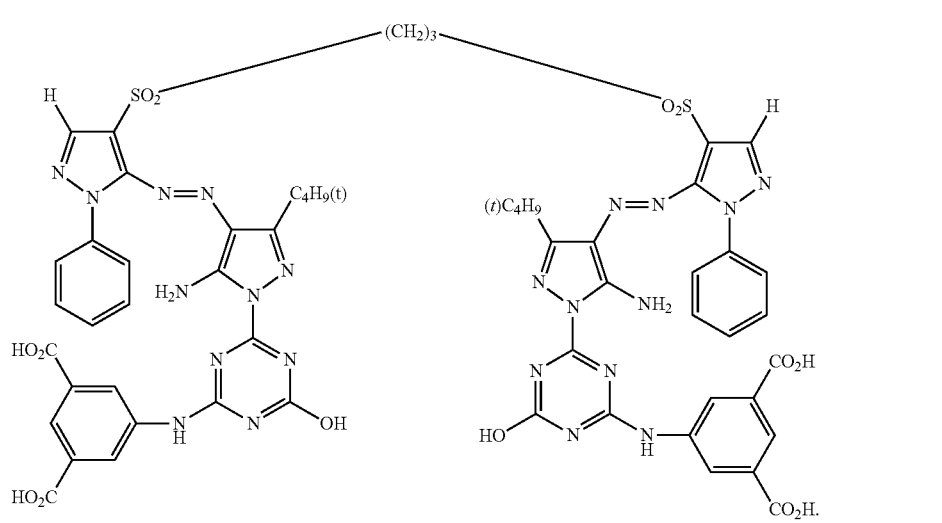
Formula Y-054

10. The ink set according to claim 4, wherein the dye is selected from the group consisting of Formulas Y-051, Y-052, Y-053, and Y-054:
Formula Y-051
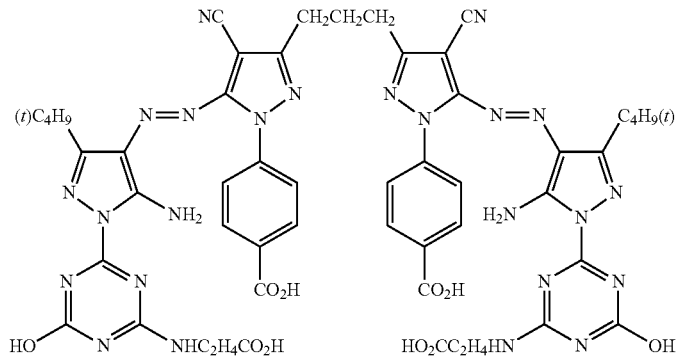
Formula Y-052
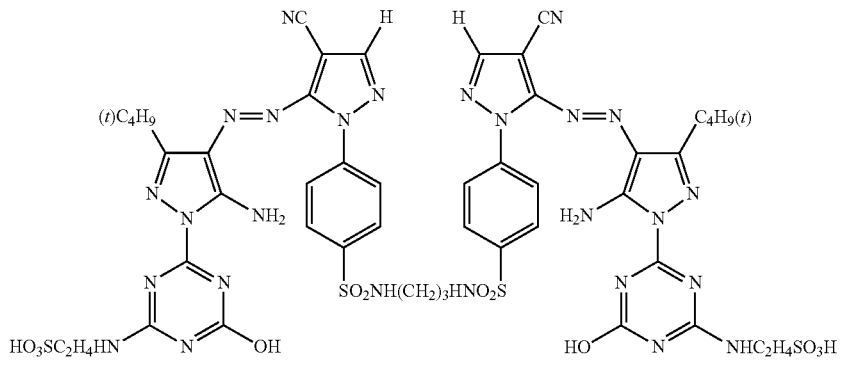
Formula Y-053
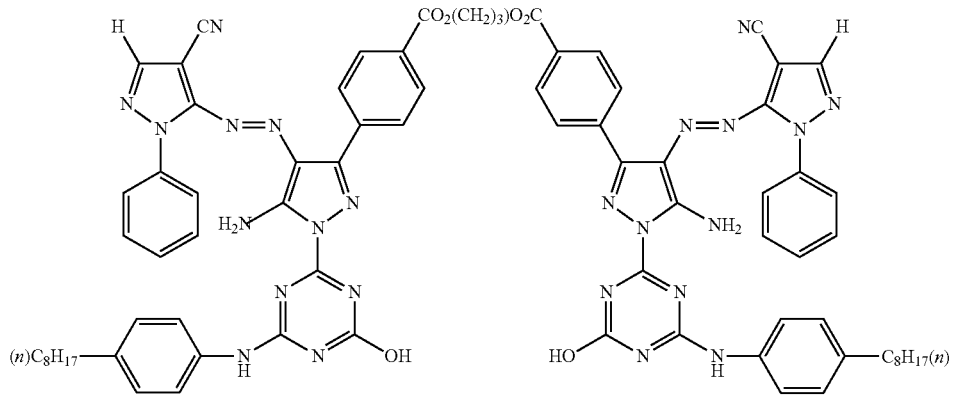
Formula Y-054
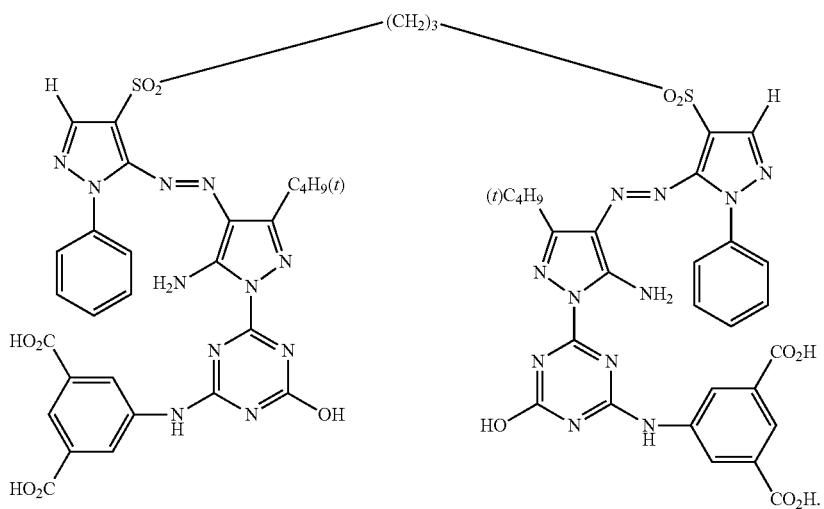

11. The image recording method according to claim 6, wherein the dye is selected from the group consisting of Formulas Y-051, Y-052, Y-053, and Y-054:
Formula Y-051
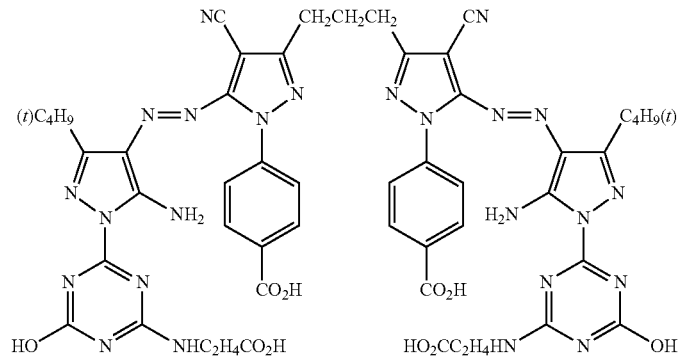
Formula Y-052
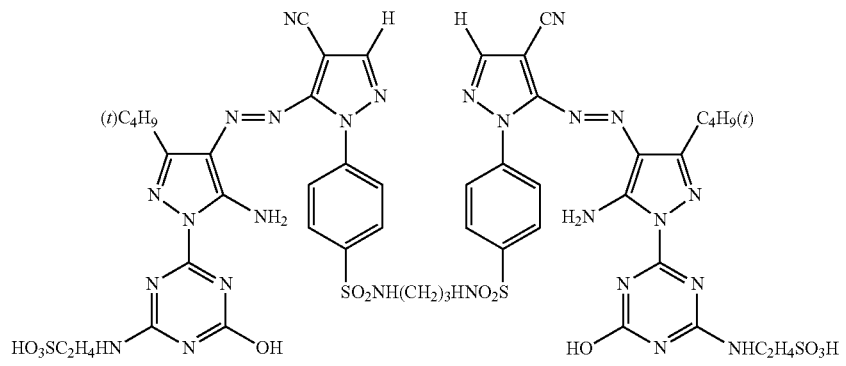
Formula Y-053
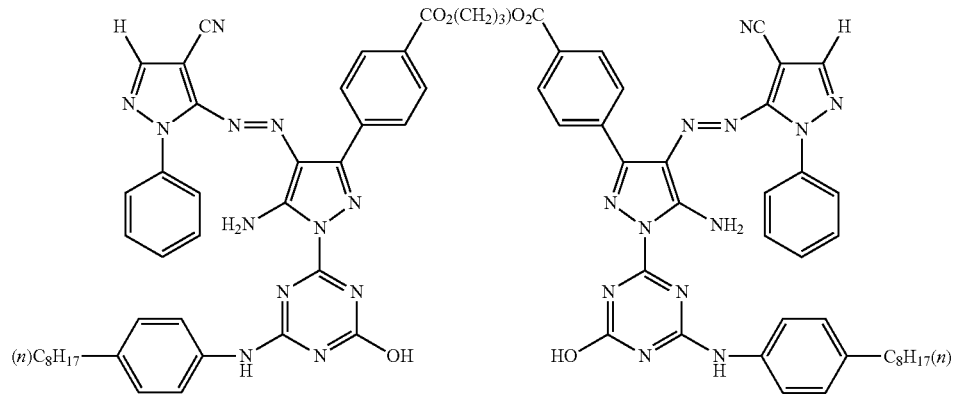
Formula Y-054
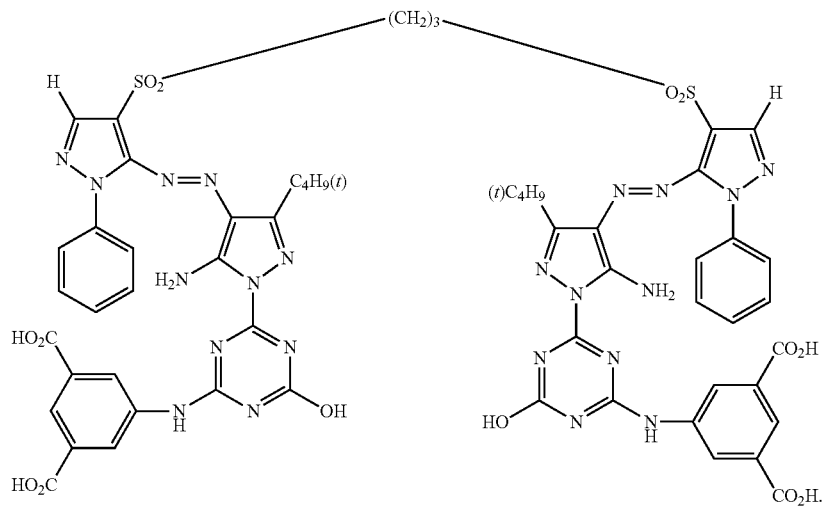

12. The image recording method to claim 7, wherein the dye is selected from the group consisting of Formulas Y-051, Y-052, Y-053, and Y-054:
Formula Y-051
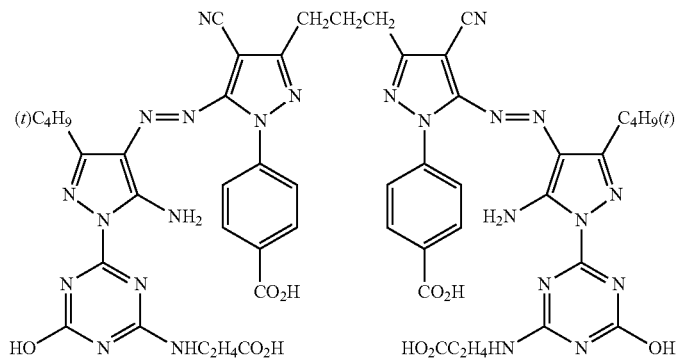
Formula Y-052
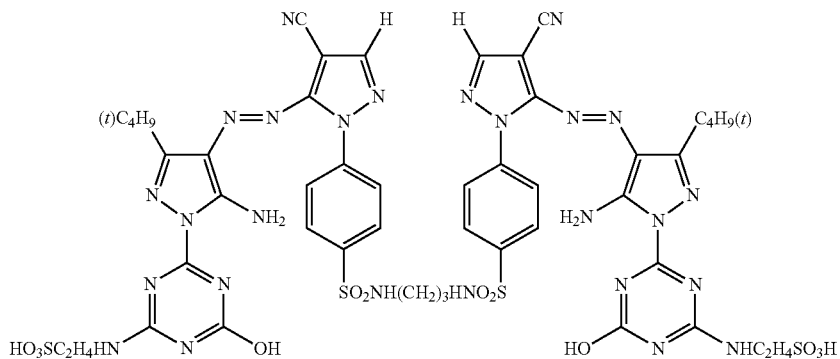
Formula Y-053
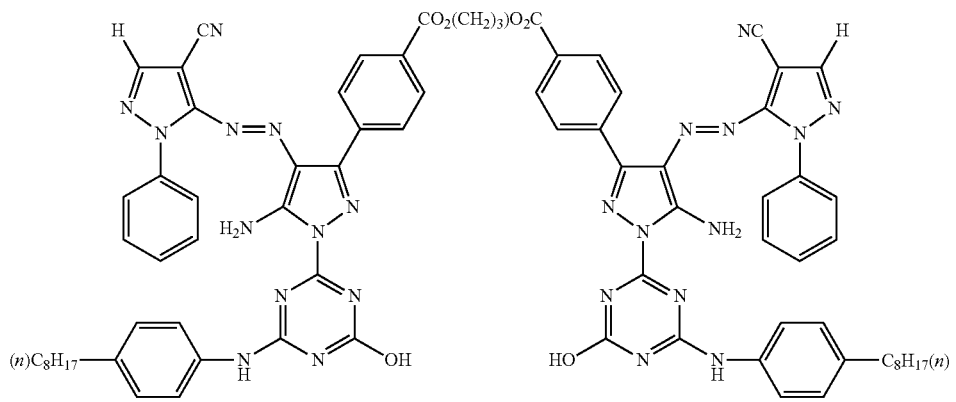
Formula Y-054
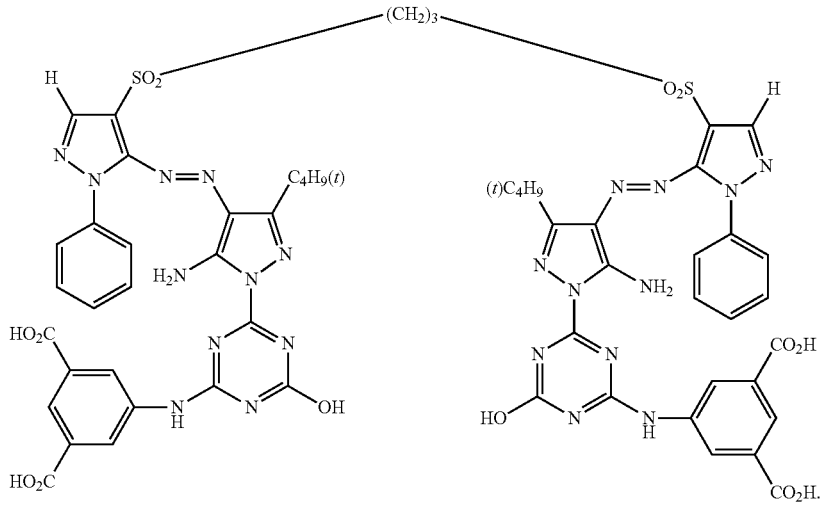

13. The image recording method according to claim 8, wherein the dye is selected from the group consisting of Formulas Y-051, Y-052, Y-053, and Y-054:
Formula Y-051
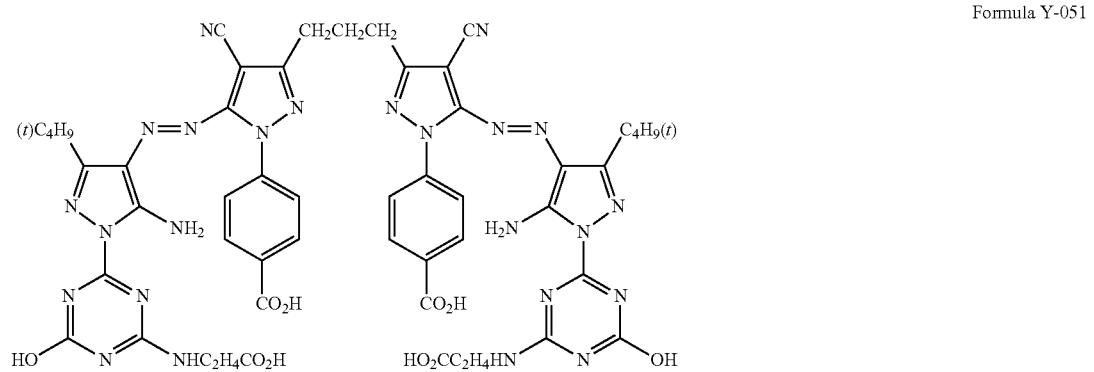
Formula Y-052
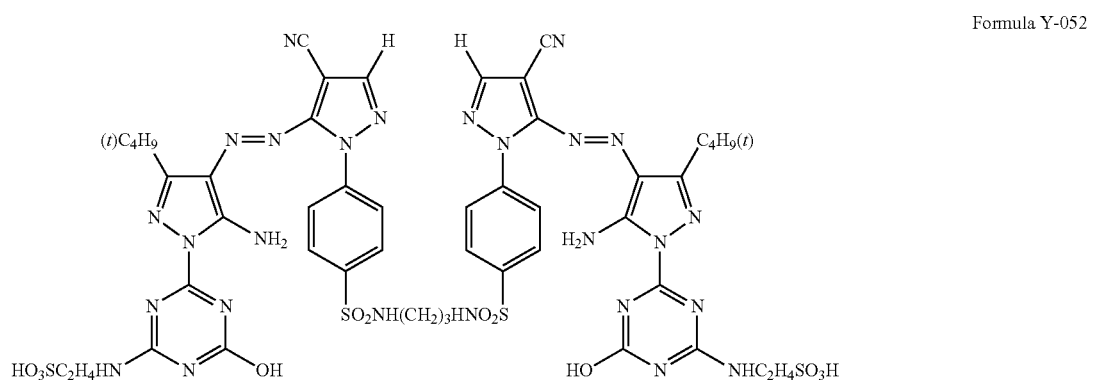
Formula Y-053
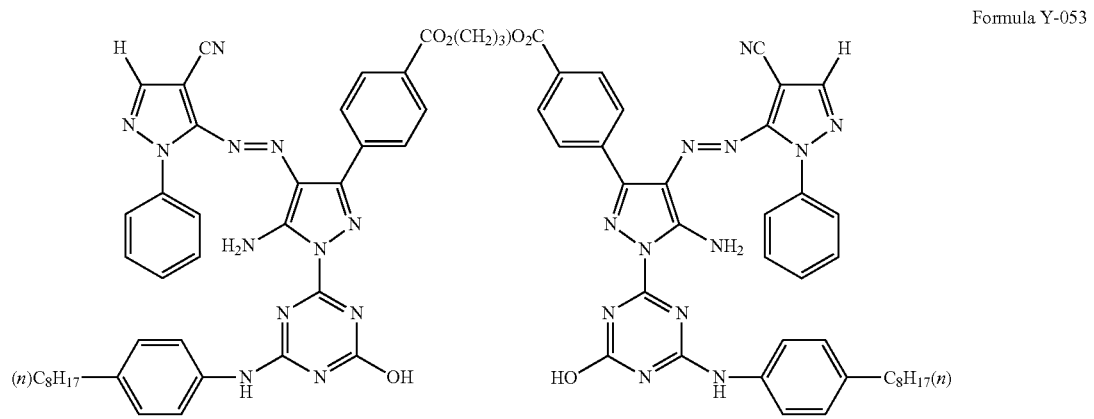

-continued
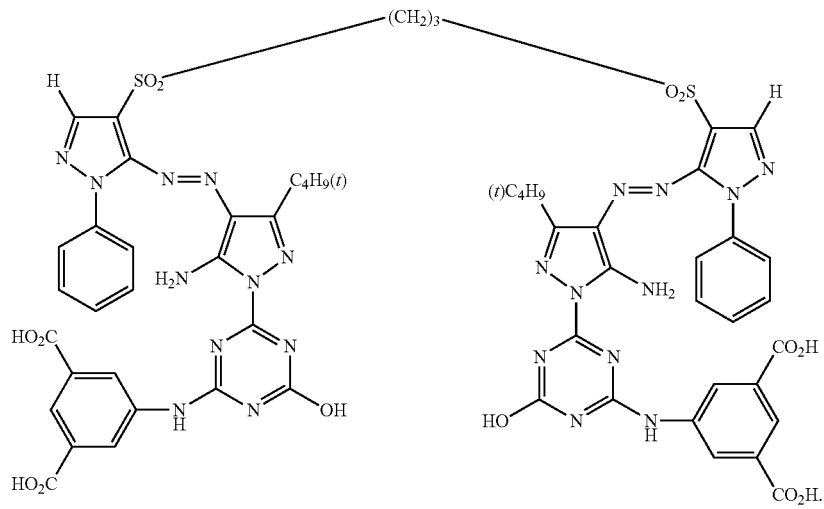
Formula Y-054
* * * * *